United States Patent
Nakahori

(10) Patent No.: US 8,081,492 B2
(45) Date of Patent: *Dec. 20, 2011

(54) SWITCHING POWER SUPPLY WITH SMOOTHING CIRCUITRY FOR MORE STABLE OUTPUT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 538 days.

This patent is subject to a terminal disclaimer.

(21) Appl. No.: 12/258,518

(22) Filed: Oct. 27, 2008

(65) Prior Publication Data

US 2009/0109709 A1 Apr. 30, 2009

(30) Foreign Application Priority Data

Oct. 29, 2007 (JP) ................................ P2007-280576
Dec. 28, 2007 (JP) ................................ P2007-340720
Aug. 5, 2008 (JP) ................................ P2008-202263

(51) Int. Cl.
*H02M 3/22* (2006.01)
*H02M 7/08* (2006.01)
*H02M 7/48* (2007.01)

(52) U.S. Cl. ................................ 363/16; 363/67; 363/71

(58) Field of Classification Search ...................... 363/17, 363/67, 71

See application file for complete search history.

(56) References Cited

U.S. PATENT DOCUMENTS

| 4,062,057 | A  | * | 12/1977 | Perkins et al. ................... 363/71 |
| 5,351,175 | A  | * | 9/1994  | Blankenship ...................... 363/16 |
| 6,281,779 | B1 |   | 8/2001  | Matsumoto et al. |
| 6,362,986 | B1 |   | 3/2002  | Schultz et al. |
| 6,831,845 | B2 | * | 12/2004 | Biebach ........................... 363/16 |
| 6,952,353 | B2 |   | 10/2005 | Yan et al. |
| 7,016,203 | B2 |   | 3/2006  | Xu et al. |
| 7,136,293 | B2 |   | 11/2006 | Petkov et al. |
| 7,199,569 | B1 | * | 4/2007  | Nakahori ........................ 323/355 |
| 2006/0145800 | A1 |   | 7/2006  | Dadafshar et al. |
| 2006/0197510 | A1 |   | 9/2006  | Chandrasekaran |
| 2007/0097571 | A1 |   | 5/2007  | Dinh et al. |
| 2009/0079402 | A1 | * | 3/2009  | Nakahori ........................ 323/255 |
| 2009/0109709 | A1 | * | 4/2009  | Nakahori ......................... 363/16 |

(Continued)

FOREIGN PATENT DOCUMENTS

JP A-8-181024 7/1996

(Continued)

OTHER PUBLICATIONS

Office Action dated Apr. 20, 2011 issued in U.S. Appl. No. 12/234,274.

*Primary Examiner* — Matthew Nguyen
*Assistant Examiner* — Gary Nash
(74) *Attorney, Agent, or Firm* — Oliff & Berridge, PLC

(57) ABSTRACT

The first choke coil and the third choke coil are not magnetically coupled to the second choke coil and the fourth choke coil. Therefore, even in a case where a structure for increasing the heat radiation area is adopted, a pair of the first and third choke coils and a pair of the second and fourth choke coils located between the two ends of the capacitor maintain a state of equilibrium so as to be inversely proportional to mutual loss without affecting one another, and the output therefore stabilizes. Accordingly, the output of the switching power supply, that is, the rectified and smoothed output across the two ends of the capacitor stabilizes.

8 Claims, 11 Drawing Sheets

U.S. PATENT DOCUMENTS

2010/0182814 A1 * 7/2010 Tada et al. .................... 363/134

FOREIGN PATENT DOCUMENTS

| JP | B2-2629999 | 7/1997 |
| --- | --- | --- |
| JP | A-2000-260639 | 9/2000 |
| JP | A-2004-22613 | 1/2004 |
| JP | A-2005-26846 | 3/2005 |
| JP | A-2005-86948 | 3/2005 |
| JP | A-2006-14535 | 1/2006 |
| JP | A-2006-20410 | 1/2006 |
| JP | A-2007-104766 | 4/2007 |

* cited by examiner

SWITCHING POWER SUPPLY WITH SMOOTHING CIRCUITRY FOR MORE STABLE OUTPUT

BACKGROUND OF THE INVENTION

1. Field of the Invention

The present invention relates to a switching power supply.

2. Related Background Art

A conventional switching power supply has a plurality of coils wound on a single core. However, with such a core, there is a problem that the heat radiation surface area is small. U.S. Pat. No. 6,362,986 adopts a core material which has a plurality of cores. The exposed surface area of the core and coil and so forth is therefore large.

SUMMARY OF THE INVENTION

However, a switching power supply which has a more stable output is needed. The present invention was conceived in view of this problem and an object of the present invention is to provide a switching power supply which has a stable output.

In order to solve this problem, the switching power supply according to a first aspect is a switching power supply that comprises a smoothing circuit connected downstream of a plurality of rectifier circuits, the smoothing circuit comprising first and second choke coils one end of each of which is connected to one end of a capacitor; third and fourth choke coils one end of each of which is connected to the other end of the capacitor; a first core, around which the first and third choke coils are disposed; a second core, around which the second and fourth choke coils are disposed; and a common core. Here, one annular magnetic path that passes within the first core and the common core is formed by currents that flow simultaneously through the first and third choke coils and another magnetic path that passes within the second core and the common core is formed by currents that flow simultaneously through the second and fourth choke coils in synchronization with currents that flow simultaneously through the first and third choke coils. 'Simultaneously' means substantially together, not signifying a strict correlation but rather signifying not in different periods.

The smoothing circuit connected downstream of the rectifier circuit is constituted by a capacitor and a choke coil. Here, in cases where a core material of an E-E core, an E-I core, or a U-I core or the like which has two annular magnetic paths via a common core is used and a choke coil is wound on a first core and a second core, the heat radiation surface area of the choke coil can be increased in comparison with a case where the choke coil is wound only around a common core and the heat radiation characteristic improves. Hence, a stable choke coil operation is possible. In addition, first and second choke coils, which form respective annular magnetic paths within the first and second cores, are connected to one end of the capacitor while third and fourth choke coils, which form respective annular magnetic paths within the first and second cores, are connected to the other end of the capacitor. During smoothing, current that is output from each transformer flows simultaneously to the capacitor by flowing, at the same time, through a plurality of choke coils that correspond with different cores. A pair of the first and third choke coils and a pair of the second and fourth choke coils maintain a state of equilibrium so as to be inversely proportional to mutual loss and the characteristic differences between the choke coils can be compensated for, whereby the output therefore stabilizes further.

The switching power supply according to a second aspect comprises a plurality of transformers having first and second transformers, wherein a primary coil of the plurality of transformers is driven by a single inverter circuit or a plurality of inverter circuits, and a secondary coil of the plurality of transformers is connected to the plurality of rectifier circuits.

The switching power supply according to a third aspect comprises a single transformer, wherein a primary coil of the transformer is driven by a single inverter circuit or a plurality of inverter circuits, and a secondary coil of the transformer is connected to the plurality of the rectifier circuits.

When the respective transformers are driven by a single inverter circuit or a plurality of inverter circuits, a voltage is induced in the secondary coil and current flowing therethrough is rectified by a plurality of rectifier circuits, whereupon the current is smoothed by means of a smoothing circuit.

In cases where there is a plurality of inverter circuits, the plurality of inverter circuits comprise a first inverter circuit that drives a first transformer and a second inverter circuit that drives a second transformer, wherein the plurality of rectifier circuits comprise first and second rectifier circuits connected to the secondary coils of the first and second transformers but may also comprise three or more inverter circuits and a rectifier circuit.

In the switching circuit power supply according to the fourth aspect, a plurality of rectifier circuits comprise plurality of the rectifier circuits comprise first and second rectifier circuits connected to the secondary coils of the first and second transformers, wherein the first rectifier circuit is a first center tap full-wave rectifier circuit that is connected to the secondary coil of the first transformer, the second rectifier circuit is a second center tap full-wave rectifier circuit that is connected to the secondary coil of the second transformer, the first choke coil is connected to the current output side of the first rectifier circuit, the third choke coil is connected to the current input side of the first rectifier circuit, the second choke coil is connected to the current output side of the second rectifier circuit, and the fourth choke coil is connected to the current input side of the second rectifier circuit.

The center tap full-wave rectifier circuit comprises two half-wave rectifier circuits and, because the output of a broken transformer is also rectified to the same polarity by the half-wave rectifier circuits, there is the advantage that the power conversion efficiency rises and the ripple voltage drops.

In the switching power supply according to the fifth aspect, the plurality of rectifier circuits comprise first and second rectifier circuits connected to the secondary coils of the first and second transformers, wherein the first rectifier circuit is a first center tap full-wave rectifier circuit that is connected to the secondary coil of the first transformer, the second rectifier circuit is a second center tap full-wave rectifier circuit that is connected to the secondary coil of the second transformer, the first choke coil is connected to the current output side of the second rectifier circuit, the third choke coil is connected to the current input side of the first rectifier circuit, the second choke coil is connected to the current output side of the first rectifier circuit, and the fourth choke coil is connected to the current input side of the second rectifier circuit.

In the case of the connective relationship of the fourth aspect, the rectifier circuits and cores correspond on a one-for-one basis and, in the case of the connective relationship of the fifth aspect, some of the relationships between the rectifier circuits and the cores of the choke coils are switched. That is, there is the advantage that, in the former case, the connection is straightforward and, in the latter case, it is possible to further equalize the characteristic differences between the rectifier circuits and the choke coils wound on the cores.

The connective relationships of the rectifier circuits can also be switched.

In other words, in the switching power supply according to the sixth aspect, the plurality of rectifier circuits comprise first and second rectifier circuits connected to the secondary coils of the first and second transformers, wherein the first rectifier circuit is a first center tap full-wave rectifier circuit that is connected to one secondary coil of the first transformer and the other secondary coil of the second transformer, the second rectifier circuit is a second center tap full-wave rectifier circuit that is connected to the other secondary coil of the first transformer and one secondary coil of the second transformer, the first choke coil is connected to the current output side of the second rectifier circuit, the third choke coil is connected to the current input side of the first rectifier circuit, the second choke coil is connected to the current output side of the first rectifier circuit, and the fourth choke coil is connected to the current input side of the second rectifier circuit.

That is, in this case, one rectifier circuit is connected to the secondary coils of a plurality of transformers and it is therefore possible to compensate for the characteristic differences between the secondary coils.

In the switching power supply according to the seventh aspect, the primary coils of the respective first and second transformers in the switching power supply whose AC resistances during driving by the inverter circuits become high alternately are preferably connected in series.

In cases where mutually opposite currents flow to the primary coil and secondary coil, the influence of the skin effect and of the proximity effect is reduced and the AC resistance becomes low. The other AC resistance of the serially connected primary coil becomes relatively higher than the reduced AC resistance. In this case, because the primary coil with a high AC resistance absorbs the resonance component, ringing of the output can be suppressed.

Furthermore, the rectifier elements constituting the rectifier circuit comprise transistors and the rectifier circuit can be made to function as an inverter circuit by switch-driving the transistors, and it is also possible to transmit power in the reverse direction via the rectifier circuit from the power supply provided downstream of the rectifier circuit. Bidirectional power conversion is accordingly possible.

The present switching power supply has a stable output.

DESCRIPTION OF THE PREFERRED EMBODIMENTS

The switching power supply according to an embodiment will be described hereinbelow. The same reference symbols are used for the same elements and repetition will be avoided in the description.

Figure 1:
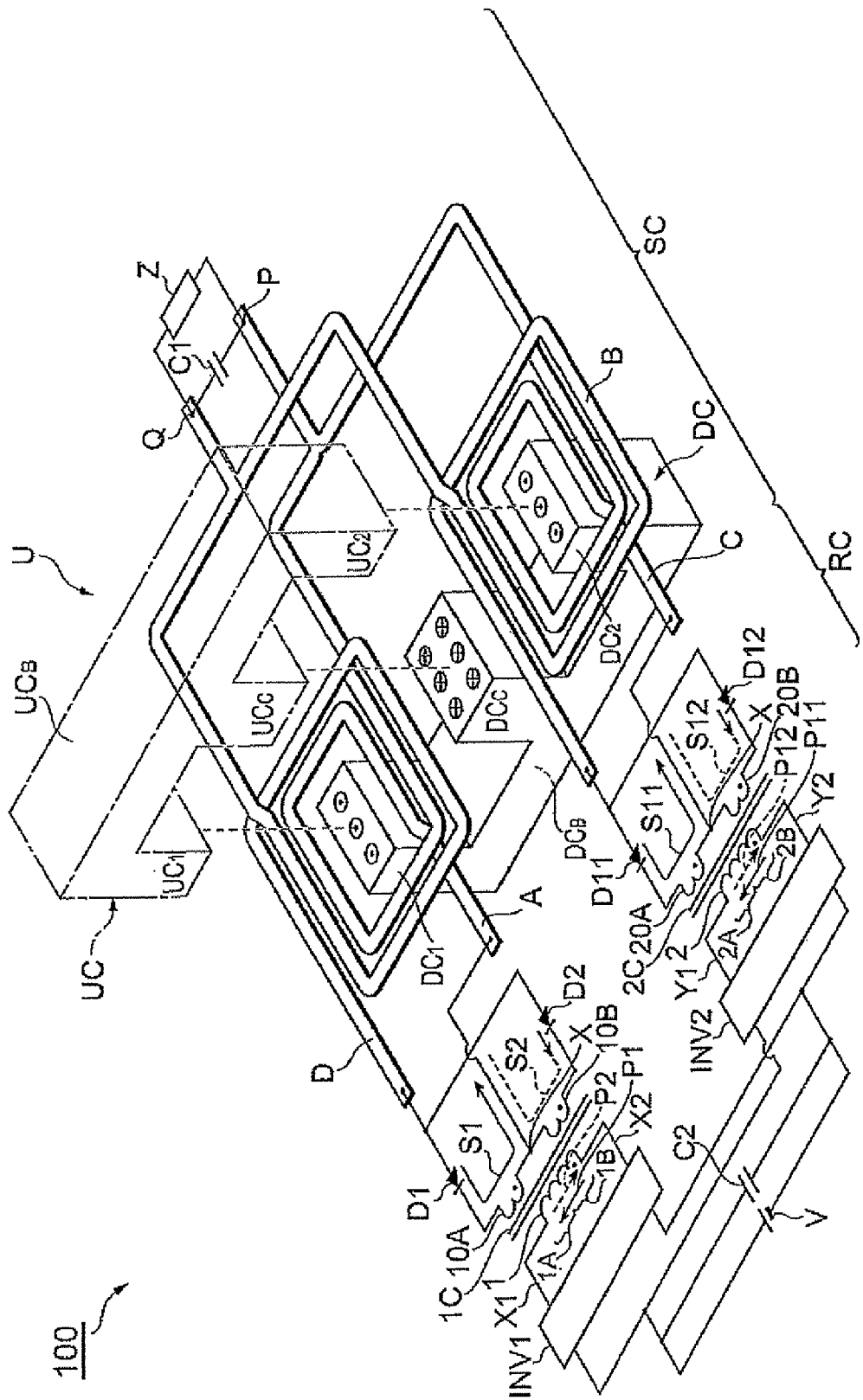
FIG. 1 is a perspective view of a switching power supply 100 according to a first embodiment.
Figure 2:
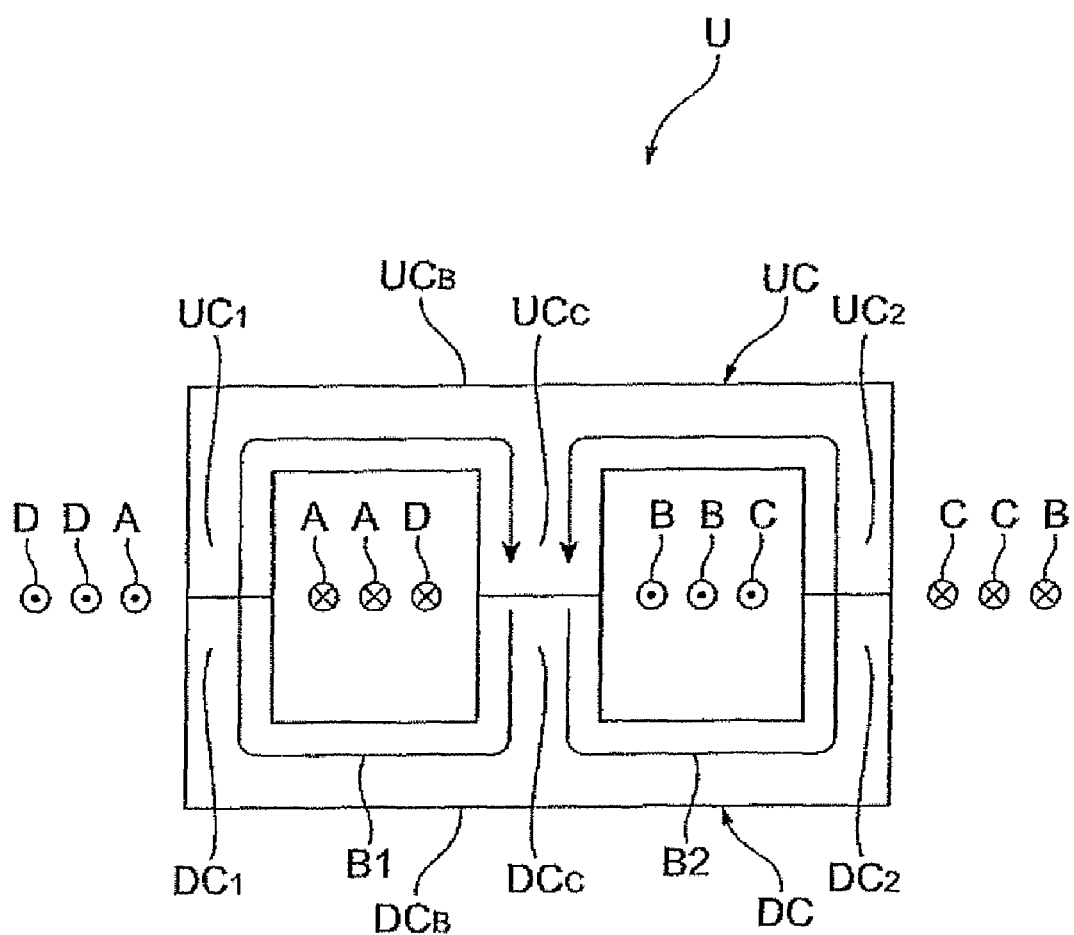
FIG. 2 shows a cross-sectional constitution of a core material U of the choke coil.

FIG. 1 is a perspective view of the switching power supply 100 according to the first embodiment and FIG. 2 shows a cross-sectional constitution of the core material U of the choke coil.

The switching power supply 100 comprises a plurality of transformers each having primary coils driven by a plurality of inverter circuits INV1 and INV2, a plurality of rectifier circuits RC connected to secondary coils of the plurality of transformers, and a smoothing circuit SC connected downstream of the plurality of rectifier circuits RC. In other words, the switching power supply 100 comprises a plurality of primary coils 1 and 2 connected between the respective output terminals X1 and X2 and Y1 and Y2 of the plurality of inverter circuits INV1 and INV2 respectively. A DC power supply V is interposed between the respective input terminals of the inverter circuits INV1 and INV2 and a capacitor C2 is connected in parallel to the DC power supply V.

By switching the inverter circuits INV1 and INV2, an AC current is made to flow across the output terminals X1 and X2 and an AC current is made to flow across the output terminals Y1 and Y2. These output currents are in-phase and a current flows from the output terminal X1 (Y1) to X2 (Y2) in a certain period and a current flows from the output terminal (Y2) to X1 (Y1) in the next period. FIG. 2 shows an aspect in which a current P1 (P11) flows from the output terminal X2 (Y2), which is the terminal at the start of the winding, toward the output terminal X1 (Y1), which is the terminal at the end of the winding. The current in the opposite direction to the current P1 is P2 (P12).

The primary coil 1 is magnetically coupled to the secondary coils 10A and 10B via a core 1C and constitutes a first transformer. The primary coil 2 is magnetically coupled to the secondary coils 20A and 2B via a core 2C and constitutes a second transformer. Thus, the switching power supply 100 comprises a plurality of secondary coils 10A, 10B, 20A, and 20B magnetically coupled to the plurality of primary coils 1 and 2 respectively.

A first choke coil A and a third choke coil D are disposed downstream of the first transformer and a second choke coil C and a fourth choke coil B are disposed downstream of the second transformer. The winding of each choke coil is as follows when viewed from above the drawing.

First choke coil (A): the current flowing from a connection point X to the choke coil has counterclockwise rotation;

Second choke coil (C): the current flowing from a connection point Y to the choke coil has counterclockwise rotation;

Third choke coil (D): the current flowing from the choke coil to the connection point X has counterclockwise rotation; and Fourth choke coil (B): the current flowing from the choke coil to the connection point Y has counterclockwise rotation.

The secondary coils 10A and 10B are connected to the connection point X. The secondary coils 10A and 10B and diodes D1 and D2 are connected so that currents S1 and S2 from the cathodes of the diodes D1 and D2 flow alternately in synchronization with the driving by the inverter circuit INV1 to the connection point X of the secondary coils 10A and 10B and the diodes D1 and D2 constitute a center tap full-wave rectifier circuit in which current flows to only one diode in a certain period.

Furthermore, the secondary coils 20A and 20B are connected to the connection point Y. The secondary coils 20A and 20B and the diodes D11 and D12 are connected to the connection point Y of the secondary coils 20A and 20B so that currents S11 and S12 from the cathodes of the diodes D11 and D12 flow alternately in synchronization with the driving by the inverter circuit INV2 and the diodes D11 and D12 constitute a center tap full-wave rectifier circuit in which a current flows to only one diode in a certain period. Thus, the plurality of rectifier circuits RC are connected to the secondary coils of the first and second transformers.

The connection point X is connected to the first choke coil A, the two ends of the coil comprising the secondary coils 10A and 10B are connected to the third choke coil D via the diodes D1 and D2 respectively, and the third choke coil D is connected to one terminal Q of the capacitor C1.

The first choke coil A and second choke coil C are connected to one terminal P of the capacitor C1 and the third choke coil D and the fourth choke coil B are connected to the other terminal Q of the capacitor C1. A load Z is connected across the two ends of the capacitor C1.

The connection point Y is connected to the second choke coil C; the two ends of the coils comprising secondary coils 20A and 20B are connected to the four choke coil B via the diodes D11 and D12 respectively and the fourth choke coil B is also connected to one terminal Q of the capacitor C1.

The first choke coil A and the third choke coil D are disposed wound around the circumferences of first cores $UC_1$ and $DC_1$ and a magnetic flux in the same direction (FIG. 2: first annular magnetic path B1) is generated by the current flowing through the first choke coil A and the third choke coil D simultaneously. 'Simultaneously' means substantially at the same time and does not signify strict simultaneity or different periods.

The second choke coil C and fourth choke coil B are disposed wound around the circumferences of second cores $UC_2$ and $DC_2$ and a magnetic flux in the same direction (FIG. 2: second annular magnetic path B2) is generated by the current flowing through the second choke coil C and fourth choke coil B at the same time. In other words, in cases where the currents S1 and S11 flow simultaneously in a certain period, current flows simultaneously to the choke coils A to D and, in cases where the currents S2 and S12 flow simultaneously in the next period, current flows simultaneously to the choke coils A to D.

The core material U has two annular magnetic paths such as an E-E core or E-I core or the like and comprises the first cores $UC_1$ and $DC_1$ and the second cores $UC_2$ and $DC_2$. This example shows an E-E core and the core material U comprises an upper E-type core UC and a lower E-type core DC. The upper E-type core UC comprises a base core $UC_B$, and a center core (common core) $UC_C$, the first core $UC_1$ and the second core $UC_2$, which constitute three legs, extend from the base core $UC_B$. The lower E-type core DC comprises a base core $DC_B$, and a center core (common core) $DC_C$, the first core $DC_1$, and the second core $DC_2$, which constitute three legs, extend from the base core $DC_B$.

A gap may also be provided between the upper and lower center cores $UC_C$ and $DC_C$. Gaps may also be provided between the first cores $UC_1$ and $DC_1$ and between the second cores $UC_2$ and $DC_2$. In addition, gaps may be provided between the center cores $UC_C$ and $DC_C$, between the first cores $UC_1$ and $DC_1$ and between the second cores $UC_2$ and $DC_2$.

As shown in FIG. 2, the core material U comprises a first annular magnetic path B1, which runs from the center cores $UC_C$ and $DC_C$ and returns to the center cores $UC_C$ and $DC_C$ via the first cores $UC_1$ and $DC_1$ on the one side and a second annular magnetic path B2, which runs from the center cores $UC_C$ and $DC_C$ and returns to the center cores $UC_C$ and $DC_C$ via the second cores $UC_2$ and $DC_2$ on the other side. The orientation of the magnetic flux of the first annular magnetic path B1 in the center cores $UC_C$ and $DC_C$ is the same as the orientation of the magnetic flux of the second annular magnetic path B2.

When an AC current flows to the primary coils 1 and 2 via the inverter circuits INV1 and INV2, an induced voltage is generated in the secondary coils 10A, 10B, 20A, and 20B. The secondary coils 10A, 10B, 20A, and 20B form a center tap connection and the connection points X (Y) of the secondary coils 10A and 10B (20A and 20B) are connected to the choke coils A (C) wound on different cores and the anode sides of the diodes are connected to the choke coil D (B) wound on different cores. The currents S1 and S11 (S2, S12) flowing through the secondary coils are smoothed by the inductances of the choke coils A to D and the capacity of the capacitor C1. The secondary coils 10A and 10B (20A and 20B) are connected to the connection point X (Y) so that current flows from the diodes D1, D2 (D11, D12).

In this example, a same-polarity relative relationship exists between the secondary coils 10A and 10B (20A and 20B) and the primary coils 1 (2). Therefore, one diode blocks current in a certain period of the respective transformers and current flows only to one of the secondary coils 10A and 10B (20A and 20B) and is smoothed by the smoothing circuit SC.

Here, in cases where a core material such as an E-E core, an E-I core, or a U-I core or the like which has two annular magnetic paths B1 and B2 via the center cores $UC_C$ and $DC_C$ is used and choke coils are wound on the first and second cores, in comparison with a case where a choke coil is wound only around the common core, the surface area in a direction horizontal to the outside of the first and second cores can increase without being limited to the interval between the first core and the common core and the interval between the second core and the common core, the heat radiation area of the choke coils can be increased, and the heat radiation characteristic improves. A stable choke coil operation is therefore possible.

Additionally, in a case where this structure is adopted, the magnetic flux generated by each choke coil is the same for each of the annular magnetic paths B1 and B2 and the orientation of the magnetic flux of the first annular magnetic path B1 and the second annular magnetic path B2 in the center cores $UC_C$ and $DC_C$ is the same. Hence, the magnetic flux circulating in the first cores $UC_1$ and $DC_1$ and the second cores $UC_2$ and $DC_2$, which are legs outside the magnetic flux, is apparently not generated.

That is, the first choke coil A and the third choke coil D are not magnetically coupled to the second choke coil C and the fourth choke coil B and, therefore, even when the structure described above for increasing the heat radiation surface area is adopted, a pair of the first and third choke coils A and D, and a pair of the second and fourth choke coils C and B maintain a state of equilibrium so as to be inversely proportional to mutual loss without affecting one another, and the output therefore stabilizes. Accordingly, the output of the switching power supply, that is, the rectified and smoothed output across the two ends P and Q of the capacitor C1 stabilizes. In other words, during smoothing, the current which is output by the plurality of transformers flows simultaneously to the capacitor by passing, at the same time, through a plurality of choke coils that correspond with different cores. Hence, the characteristic difference of the choke coils can be compensated for and the output stabilizes further.

A serial connection between a coil 1A which forms half of the primary coil 1 and a coil 1B which forms the other half of the primary coil 1 can be considered. A serial connection between a coil 2A which forms half of the primary coil 2 and a coil 2B which forms the other half of the primary coil 2 can also be considered. In other words, the primary coils 1 and 2 whose AC resistances become high alternately during driving by the inverter circuits INV1 and INV2 are connected in series.

A current S1 or S2 (S11 or S12) flows to only one of the secondary coils 10A and 10B (20A and 20B) in a certain period. In cases where mutually opposite currents flow to the primary coil and secondary coil, the influence of the skin effect and of the proximity effect is reduced and the AC resistance becomes low. In the case of a combination of the reverse current P1 (P11) and the current S1 (S11), the AC resistance of the coil 1A (2A) becomes low and the AC resistance of the coil 1B (2B) becomes relatively high. In the case of the combination of the reverse current P2 (P12) and current S2 (S12), the AC resistance of the coil 1B (2B) becomes low and the AC resistance of the coil 1A (2A) becomes relatively high.

That is, the other AC resistance of the serially connected primary coil becomes relatively higher than the reduced AC resistance. In this case, because the primary coil with a high AC resistance absorbs the resonance component, ringing of the output can be suppressed.

Figure 3A:
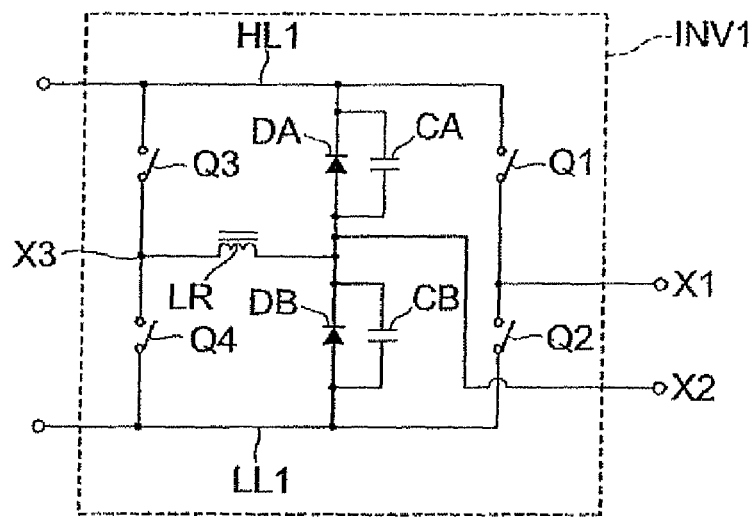
FIG. 3A is a circuit diagram of an inverter circuit INV1.
Figure 3B:
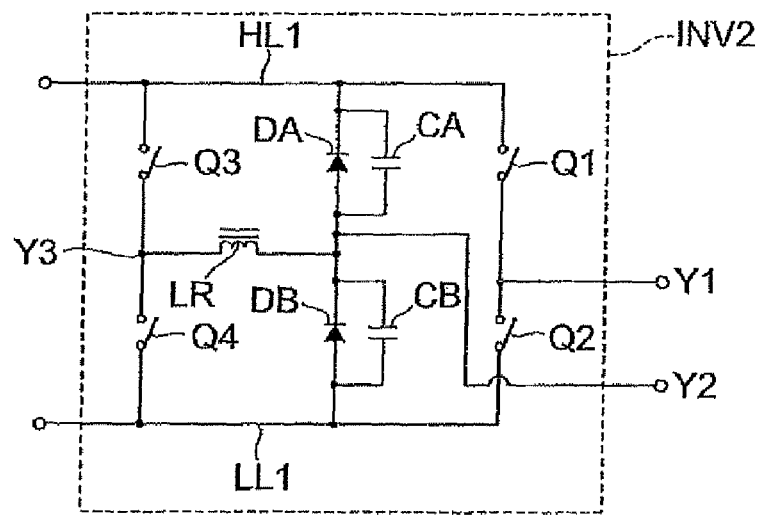
FIG. 3B is a circuit diagram of an inverter circuit INV2.
Figure 3C:
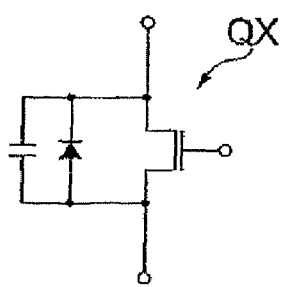
FIG. 3C is a circuit diagram (c) of a switch QX.

FIG. 3A is a circuit diagram of the inverter circuit INV1; FIG. 3B is a circuit diagram of the inverter circuit INV2; and FIG. 3C is a circuit diagram of the switch QX shown by representing one of the switches Q1 to Q4.

In the inverter circuit INV1, the switches Q1 and Q2 are connected in series between a high potential line HL1 and a low potential line LL1 and an output terminal X1 is connected to a connection point between the switches Q1 and Q2. Furthermore, switches Q3 and Q4 are connected in series between the high potential line HL1 and the low potential line LL1 and the output terminal X2 is connected to a connection point between the switches Q3 and Q4 via a resonance inductor LR. The connection point between the resonance inductor LR and the output terminal X2 may also be connected to the connection point between the diode DA and the diode DB. The diode DA and the diode DB are connected in series in a state where a reverse bias is applied between the high potential line HL1 and the low potential line LL1 and the capacitors CA and CB which constitute parasitic elements are connected in parallel between the anode and cathode of the respective diodes DA and DB if necessary.

When the switches Q2 and Q3 are in an OFF state and the switches Q1 and Q4 are in an ON state, the current is output from the output terminal X1 and the current returns to the output terminal X2. However, when the switches Q1 and Q4 are in an OFF state and the switches Q2 and Q3 are in an ON state, the current is output from the output terminal X2 and current returns to the output terminal X1. These switch pairs are alternately switched and an AC current therefore flows between the output terminals X1 and X2.

The structure of the inverter circuit INV2 is the same as the structure of the inverter circuit INV1 and, in the above description, the output terminals X1 and X2 are read to the output terminals Y1 and Y2.

The switches Q1, Q2, Q3 and Q4 can each be constituted by field effect transistors as indicated representatively by 'switch QX' in FIG. 3C. However, although parasitic elements comprising diodes and capacitors are inserted in parallel between the drain and source, the diodes and capacitors may also be different elements from the transistors.

A supplementary description of the way in which the current flows will now be provided.

Figure 4:
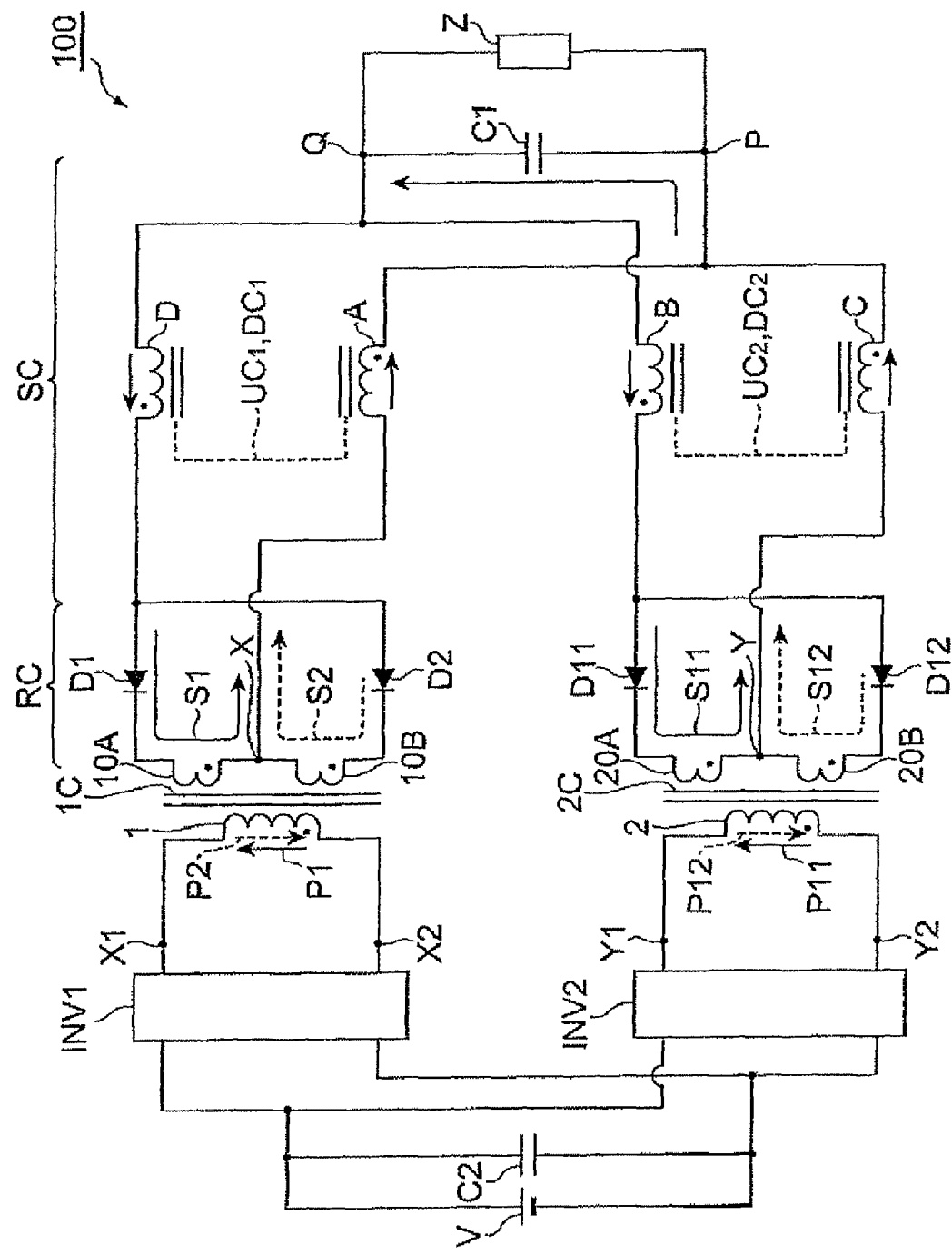
FIG. 4 is a circuit diagram of the switching power supply 100 shown in FIG. 1.

FIG. 4 is a circuit diagram of the switching power supply 100 shown in FIG. 1.

In a certain period, when the current P1 is supplied from the first inverter circuit INV1 to the primary coil 1 and the current P11 is supplied from the second inverter circuit INV2 to the primary coil 2, the currents S1 and S11 which flow in the opposite direction to the current P1 flow in the secondary coil. The currents S1 and S11 match the orientation of the forward-bias currents of the diodes D1 and D11 and the currents that flow from the choke coils D and B to the diodes D1 and D11 flow to each of the choke coils A and C via the connection points X and Y. These currents flow to the capacitor C1 via terminal P.

In the next period, when the current P2 is supplied from the first inverter circuit INV1 to the primary coil 1 and the current P12 is supplied from the second inverter circuit INV2 to the primary coil 2, the currents S2 and S12 which flow in the opposite direction to the current P2 flow in the secondary coil. The currents S2 and S12 match the orientation of the forward currents of the diodes D2 and D12 and the currents that flow from the choke coils D and B to the diodes D2 and D12 flow to each of the choke coils A and C via the respective connection points X and Y. These currents flow to the capacitor C1 via terminal P.

When the current supply to the choke coils themselves stops, the choke coils function for a short while as current sources and attempt to continue to pass current. That is, the current flowing through the secondary coils is not suddenly cut but instead continues even in the switching period of the switching.

When current flows between the two ends of the capacitor C1, a DC output voltage appears at the load Z as a result of the smoothing action due to the co-operation of the choke coil and the capacitor C1.

In the switching power supply 100, the first rectifier circuit included in the plurality of rectifier circuits RC is a center tap full-wave rectifier circuit which is connected to the secondary coils 10A and 10B of the first transformer and the second rectifier circuit is a center tap full-wave rectifier circuit that is connected to the secondary coils 20A and 20B of the second transformer. The first choke coil A is connected to the current output side of the first rectifier circuit, the third choke coil D is connected to the current input side of the first rectifier circuit the second choke coil C is connected to the current output side of the second rectifier circuit, and the fourth choke coil B is connected to the current input side of the second rectifier circuit. In the case of the connective relationship, there is the advantage that the rectifier circuits and the cores correspond one for one and connection is straightforward.

Figure 5:
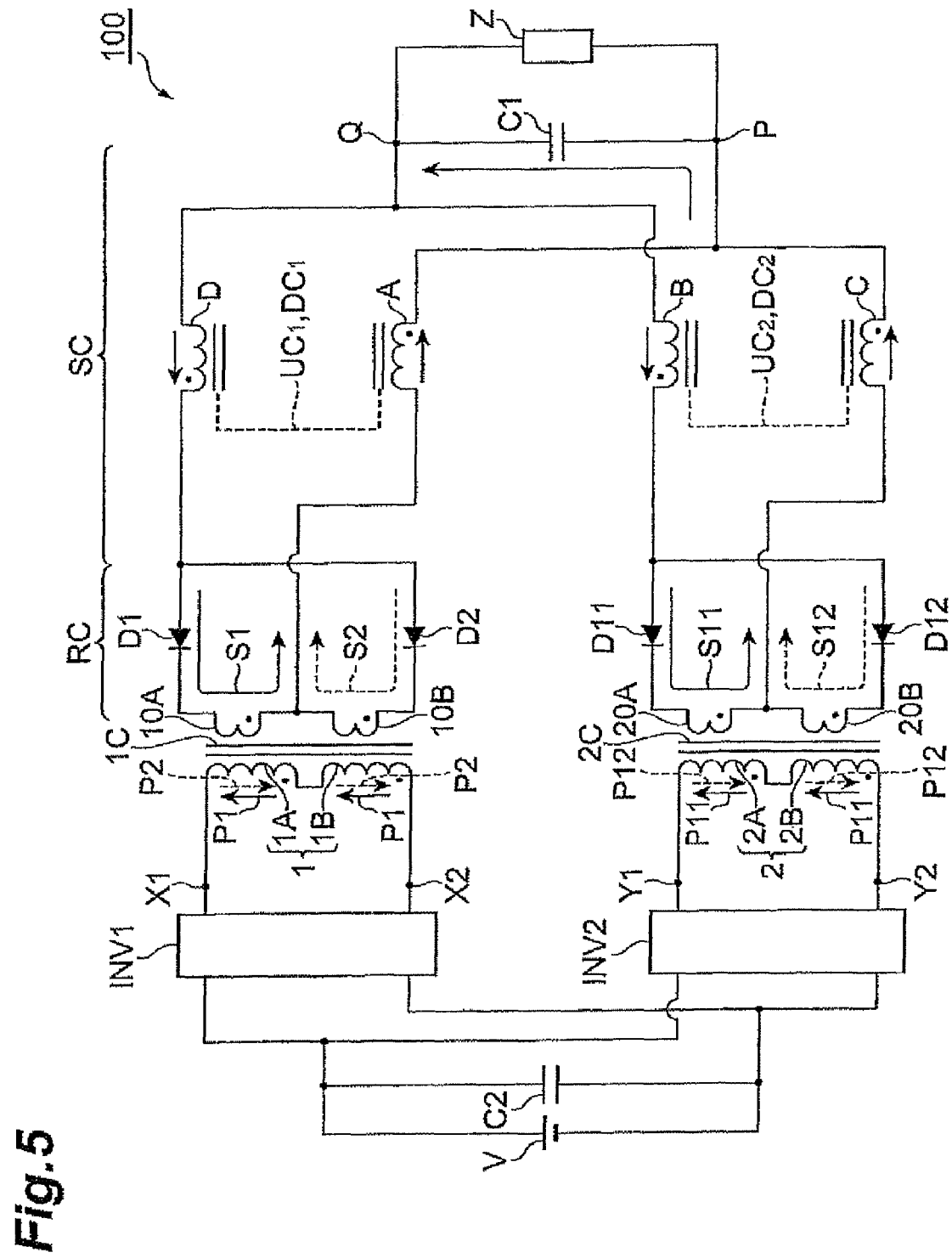
FIG. 5 is a circuit diagram of the switching power supply 100 in a case where primary coils 1 and 2 are clearly constituted by two coils 1A and 1B, and 2A and 2B respectively.

FIG. 5 is a circuit diagram of the switching power supply 100 in a case where primary coils 1 and 2 are clearly constituted by two coils 1A and 1B, and 2A and 2B respectively. By laminating the primary coils as planar coils, the overall dimensions can also be reduced. In other words, the secondary coil 10A (20A), the primary coil 1A (2A), the primary coil 1B (2B), and the secondary coil 10B (20B) can be laminated in that order in one transformer. The order of this lamination can also be the primary coil 1A (2A), the secondary coil 10A (20A), the secondary coil 10B (20B), and the primary coil 1B (2B).

The primary coil 1A is magnetically coupled to the secondary coil 10A and has the same polarity. The primary coil 1B is magnetically coupled to the secondary coil 10B and has the same polarity. The primary coil 1A and primary coil 1B are connected in series and therefore, in cases where one AC resistance becomes large relative to the other AC resistance, ringing of the first transformer can be suppressed.

The primary coil 2A is magnetically coupled to the secondary coil 20A and has the same polarity. The primary coil 2B is magnetically coupled to the secondary coil 20B and has the same polarity. The primary coil 2A and primary coil 2B are connected in series and therefore, in cases where one AC resistance becomes large relative to the other AC resistance, ringing of the second transformer can be suppressed.

When an input voltage at which the current P1 flows to the primary coil 1 is input, the current P1 flows to the primary coils 1A and 1B constituting the primary coil 1. Here, the primary coil 1A is disposed close to the secondary coil 10A in which the current S1 flows and is therefore magnetically coupled relatively closely to the secondary coil 10A. Here, the primary coil 1A and the secondary coil 10A have a mutually opposite current flow orientation based on transformer principles and therefore the AC resistance in the primary coil 1A becomes low as a result of the proximity effect.

However, because the primary coil 1B is disposed more remotely than the secondary coil 10A in which the current S1 flows, the primary coil 1B is magnetically coupled relatively loosely to the secondary coil 10A. Here, because the primary coil 1B is disposed more closely than the secondary coil 10B in which current is not flowing, the AC resistance of the primary coil 1B becomes high as a result of the proximity effect in comparison with the primary coil 1A. In this embodiment, because the primary coils 1A and 1B are connected in series to one another, an equal current flows to the primary coils 1A and 1B.

In addition, when an input voltage at which the reverse current P2 flows to the primary coil 1 is input, the current P2 flows to the primary coils 1A and 1B constituting the primary coil 1. Here, the primary coil 1B is disposed closer than the secondary coil 10B in which the current S2 flows and is therefore magnetically coupled relatively densely to the secondary coil 10B. Here, the primary coil 1B and secondary coil 10B have mutually opposite current flow orientations based on the principles of the transformer and therefore the AC resistance of the primary coil 1B becomes low as a result of the proximity effect.

However, because the primary coil 1A is disposed more remotely than the secondary coil 10B in which the current S2 flows, the primary coil 1A is magnetically coupled relatively loosely to the secondary coil 10B. Here, because the primary coil 1A is disposed more closely than the secondary coil 10A in which current is not flowing, the AC resistance of the primary coil 1A becomes high as a result of the proximity effect in comparison with the primary coil 1B. In this embodiment, because the primary coils 1A and 1B are connected in series to one another, an equal current flows to the primary coils 1A and 1B.

When the input voltage in which the current P11 flows to the primary coil 2 is input, the current P11 flows to the primary coils 2A and 2B constituting the primary coil 2. Here, because the primary coil 2A is disposed closer than the secondary coil 20A in which the current S11 flows, the primary coil 2A is magnetically coupled relatively densely to the secondary coil 20A. Here, the primary coil 2A and the secondary coil 20A have a mutually opposite current flow orientation based on transformer principles and therefore the AC resistance in the primary coil 2A becomes low as a result of the proximity effect.

However, because the primary coil 2B is disposed more remotely than the secondary coil 20A in which the current S11 flows, the primary coil 2B is magnetically coupled relatively loosely to the secondary coil 20A. Here, because the primary coil 2B is disposed more closely than the secondary coil 20B in which current is not flowing, the AC resistance of the primary coil 2B becomes high as a result of the proximity effect in comparison with the primary coil 2A. In this embodiment, because the primary coils 2A and 2B are connected in series to one another, an equal current flows to the primary coils 2A and 2B.

In addition, when an input voltage at which the reverse current P12 flows to the primary coil 2 is input, the current P12 flows to the primary coils 2A and 2B constituting the primary coil 2. Here, the primary coil 2B is disposed closer than the secondary coil 20B in which the current S12 flows and is therefore magnetically coupled relatively densely to the secondary coil 20B. Here, the primary coil 2B and secondary coil 20B have mutually opposite current flow orientations based on the principles of the transformer and therefore the AC resistance of the primary coil 2B becomes low as a result of the proximity effect.

However, because the primary coil 2A is disposed more remotely than the secondary coil 20B in which the current S12 flows, the primary coil 2A is magnetically coupled relatively loosely to the secondary coil 20B. Here, because the primary coil 2A is disposed more closely than the secondary coil 20A in which current is not flowing, the AC resistance of the primary coil 2A becomes high as a result of the proximity effect in comparison with the primary coil 2B. In this embodiment, because the primary coils 2A and 2B are connected in series to one another, an equal current flows to the primary coils 2A and 2B.

Thus, in this embodiment, because the primary coils 1A and 1B (2A and 2B) are connected to one another in series, current also flows to the coil with the large AC resistance. Hence, ringing, which is generated in the I/O voltage-current of the transformer and generated by the line capacitance of the transformer, the excited inductance of the transformer, and the LC resonance resulting from the leakage inductance of the transformer can be attenuated by the AC resistance. As a result, in comparison with a case where a state of no attenuation prevails and ringing is continuously generated, the amount of heat generated by the core loss of the transformer and the AC resistance of the transformer drops and efficiency improves.

The secondary operation is the same as the operation of the embodiment above.

The phase shift drive of the inverter circuit will be described next.

The diodes DA and DB and the capacitors CA and CB shown in FIGS. 3A and 3B constitute a surge voltage suppression circuit and the surge voltage suppression circuit is interposed between the high potential line HL1 and the low potential line LL1. The surge voltage suppression circuit ultimately suppresses the surge voltage applied to the diodes D1, D2, D11, and D12 in the rectifier circuit RC.

The inverter circuits INV1 and INV2 shown in FIG. 1 each comprise the switches Q1, Q2, Q3, and Q4 shown in FIGS.

3A and 3B and the timing of the switching, which comprises a few periods T1 to T10, is executed sequentially, thereby driving the inverter circuits. Furthermore, both the inverter circuits INV1 and INV2 are driven in-phase and the timing of the switching of the switches Q1 to Q4 of each of the inverter circuits INV1 and INV2 is the same. Periods T1 to T5 represent a half-cycle operation and the periods T6 to T10 represent the remaining half-cycle operation, while the periods T1 to T10 correspond to one cycle of the switching control.

Furthermore, the switches Q1 to Q4 are divided into two switch pairs. Specifically, the switches Q3 and Q4 are both controlled to be turned ON with fixed timing on the temporal axis and are called 'fixed-side switches'. In addition, the switches Q1 and Q2 are both controlled to be turned ON with variable timing on the temporal axis and are called 'shift-side switches'.

The switches Q1 to Q4 are driven with timing with which the high potential line HL1 and the low potential line LL1 to which a DC input voltage V is applied are not electrically short-circuited via the switches Q1 to Q4. Specifically, the switches Q1 and Q2 are not ON simultaneously, nor are the switches Q3 and Q4 ON simultaneously. The temporal interval adopted in order to avoid a state where the switch pairs Q1 and Q2 or Q3 and Q4 are ON simultaneously is known as 'dead time' and is set at the following periods T2, T4, T7, and T9.

Furthermore, the switches Q2 and Q3 have periods (T1, T10) when same are ON simultaneously and the primary coils 1 and 2 (See FIG. 1) of each transformer are excited in these periods when the switches Q2 and Q3 are ON simultaneously. Switch Q2 (shift-side switch) is switched to establish a switching phase difference $\phi$ by taking the switching timing of the switch Q3 (fixed-side switch) as a reference. When the switching phase difference $\phi$ is controlled, the time during which the switches Q2 and Q3 are ON simultaneously varies. As a result, the duty ratio of the input AC voltage that is applied to the primary coils 1 and 2 of the transformer varies and the DC output voltage applied to the load Z stabilizes.

Likewise, the switches Q1 and Q4 have periods (T5, T6) when same are ON simultaneously and the primary coils 1 and 2 (See FIG. 1) of each transformer are excited in the reverse direction from the case above during these periods when the switches Q1 and Q4 are ON simultaneously. Switch Q1 (shift-side switch) is switched to establish a switching phase difference $\phi$ by taking the switching timing of the switch Q4 (fixed-side switch) as a reference. When the switching phase difference $\phi$ is controlled, the time during which the switches Q1 and Q4 are ON simultaneously varies. As a result, the duty ratio of the input AC voltage that is applied to the primary coils 1 and 2 of the transformer varies and the DC output voltage applied to the load Z stabilizes.

A detailed description will be provided hereinbelow.

(Period T1: the Switches Q3 and Q2 are ON)

First, suppose that the switches Q3 and Q2 are in an ON state and the remaining switches Q1 and Q4 are in an OFF state and that the potential of a node X3 (Y3) between the switches Q3 and Q4 is an input voltage (=V) and the potential of terminal X1 (Y1) is 0V. The inductance of the resonance inductor LR is extremely small in comparison with the inductance of the primary coil 1 (2) of the transformer. Hence, the potential of the terminal X2 (Y2) downstream of the inductor LR is substantially the input voltage (=V). Furthermore, the potential between the terminal X1 (Y1) and the terminal X2 (Y2) is substantially the input voltage (=V).

Thereupon, the current P1 (P11) flows sequentially through the switch Q3, the node X3 (Y3), the resonance inductor LR, the terminal X2 (Y2), and the primary coil 1 (2), the terminal X1 (Y1), the switch Q2, the low potential line LL1 from the high potential line HL1 in the inverter circuit INV1 (INV2) and the respective resonance inductor LR are excited and power is transmitted from the primary side to the secondary side of the transformer. As a result, a loop current S1 flows to the secondary side of the transformer via the choke coil D, the diode D1, and the choke coil A, and a loop current S11 flows to the secondary side of the transformer via the choke coil B, the diode D11 and the choke coil C, whereby the load Z is driven. At this time, a forward-bias voltage is applied to the secondary diodes D1 and D11 and a reverse voltage is applied to the diodes D11 and D12.

(Period T2: Only the Switch Q3 is ON)

Thereafter, the switch Q2 is in an OFF state and only the switch Q3 is in an ON state. Thus, the parasitic capacitor (see FIG. 3C) of the switches Q1 and Q2 and the resonance inductor LR co-operate with one another, thereby constituting an LC series resonance circuit, and a resonance operation is performed. Although the capacitor and diode are constituted by parasitic elements that are associated with the transistor in this embodiment, the capacitor and diode can also be separate elements from the transistors.

Two current loops are formed by the resonance operation.

A first current loop is a current loop that runs from the output-side terminal X2 (Y2) of the resonance inductor LR and returns to the terminal X2 (Y2) sequentially via the primary coil 1 (2), the terminals X1 (Y1), the parasitic capacitor of the switch Q2, the low potential line LL1, and the capacitor C2 across the input power supply (See FIG. 1), the switch Q3, the node X3 (Y3).

The other current loop is a current loop that runs from the output-side terminal X2 (Y2) of the resonance inductor LR to the terminal X2 (Y2) sequentially via the primary coil 1 (2), the terminal X1 (Y1), the parasitic capacitor of the switch Q1, the high potential line HL1, the switch Q3, and the node X3 (Y3).

In this case, because the parasitic capacitor of the switch Q2 is charged while the parasitic capacitor of the switch Q1 is discharged, the potential of the terminal X1 (Y1) gradually rises and the potential of the terminal X1 (Y1) is the input voltage (=V). Further, here, the reverse voltages of the secondary diodes D2 and D12 gradually drop and finally reach 0V.

(Period T3: the Switches Q3 and Q1 are ON)

Thereafter, when the potential of the terminal X1 (Y1) becomes the input voltage (=V), the voltage across the two ends of the switch Q1 is zero volts and the diodes parasitic on the switch Q1 (See FIG. 3C) easily conduct. In the subsequent timing, with the switch Q1 in an ON state, a zero volt switching (ZVS; Zero Volt Switching) operation is performed and, as a result, the short-circuit loss of the switch Q1 is suppressed.

Furthermore, the energy that has accumulated in the resonance inductor LR within a period T1 from the point where the potential of the terminal X1 (Y1) becomes the input voltage (=V) until period T3 is circulated as current in the circuit connected to the two ends of the resonance inductor LR. Specifically, two current loops exist.

A first current loop runs from the terminal X2 (Y2), which is one end of the resonance inductor LR, to the high potential line HL1 via the primary coil 1 (2), the terminal X1, and the switch Q1, and returns to the terminal X2 via the switch Q3 and the resonance inductor LR.

The other current loop runs from the terminal X2 (Y2), which is one end of the resonance inductor LR, to the high potential line HL1 via the diode DA and returns to the terminal X2 via the switch Q3 and the resonance inductor LR.

Thus, when two current loops are formed, a portion of the current flowing through the primary coil 1 (2) flows through the diode DA. Hence, the absolute value of the current flowing through the primary coil 1 (2) decreases. In addition, the ampere turns in this transformer are equal and the current is divided into a loop current flowing through the diode D1 (D11) and a loop current flowing through the diode D2 (D12) so that the sum of the currents flowing through each of the secondary coils of the transformer is equal to the current flowing through the choke coils.

The potential difference between the terminal X2 and the high potential line HL1 in the path of these current loops becomes the sum of the voltage across the two ends of the primary coil 1 (2) of the transformer and the voltage across the two ends of the switch Q1. In addition, supposing that the winding number ratio between the primary coils and the secondary coils of the transformer is n, the voltage across the two ends of the primary coil 1 (2) of the transformer is obtained by dividing the voltage of the secondary coil by the winding number ratio n.

(Period T4: Only the Switch Q1 is ON)

Switch Q3 then enters an OFF state. Thus, the parasitic capacitor of the switches Q3 and Q4 and the resonance inductor LR co-operate with one another, thereby constituting an LC series resonance circuit, and a resonance operation is performed. Therefore, four current loops are formed.

The first current loop runs from the output-side terminal X2 (Y2) of the resonance inductor LR, passes via the primary coil 1 (2), the terminal X1 (Y1), and the switch Q1, and returns to the terminal X2 (Y2) sequentially via the high potential line HL1, the input power-side capacitor C2 (See FIG. 1), the low potential line LL1, the parasitic diode of the switch Q4 (See FIG. 3C), the node X3 (Y3), and the resonance inductor LR.

The second current loop runs from the output-side terminal X2 (Y2) of the resonance inductor LR, passes via the primary coil 1 (2), the terminal X1 (Y1), and the switch Q1, and returns to the terminal X2 (Y2) sequentially via the high potential line HL1, file parasitic capacitor of the switch Q3 (See FIG. 3C), the node X3 (Y3), and the resonance inductor LR.

The third current loop runs from the output-side terminal X2 (Y2) of the resonance inductor LR and returns to the terminal X2 (Y2) sequentially via the diode DA, the high potential line HL1, the parasitic diode of the switch Q3 (See FIG. 3C), the node X3 (Y3), and the resonance inductor LR.

The fourth current loop runs from the output-side terminal X2 (Y2) of the resonance inductor LR and returns to the terminal X2 (Y2) sequentially via the diode DA, the high potential line HL1, the input power supply-side capacitor C2 (See FIG. 1), the low potential line LL1, the parasitic capacitor of the switch Q4 (See FIG. 3C), the node X3 (Y3), and the resonance inductor LR.

In this case, because the parasitic capacitor of the switch Q3 is charged while the parasitic capacitor of the switch Q4 is discharged, the potential of the node X3 (Y3) gradually drops and finally reaches 0V.

(Period T5: Switches Q4 and Q1 are ON)

When the potential of the node X3 (Y3) is 0V, because the potential of the terminal X2 (Y2) is then the input voltage (=V) and is −V when the potential of the terminal X2 (Y2) is subtracted from the potential of the node X3 (Y3), the parasitic diode of the switch Q4 easily conducts. By placing the switch Q4 in an ON state after the voltage across the two ends of the switch Q4 has become zero volts, a ZVS operation is performed and, as a result, the short-circuit loss of the switch Q4 is suppressed.

Two current loops are also constituted and the energy that has accumulated in the resonance inductor LR is circulated via the capacitor C2 on the input power supply side following completion of the charging and discharging of the parasitic capacitor of the switches Q3 and Q4.

One current loop at this time runs from the output-side terminal X2 (Y2) of the resonance inductor LR, passes via the primary coil 1 (2), the terminal X1 (Y1), and the switch Q1, and returns to the terminal X2 (Y2) sequentially via the high potential line HL1, the capacitor C2 on the input power supply side (See FIG. 1), the low potential line LL1, the switch Q4, the node X3 (Y3), and the resonance inductor LR.

The other current loop runs from the output-side terminal X2 (Y2) of the resonance inductor LR and returns to the terminal X2 (Y2) sequentially via the diode DA, the high potential line HL1, the capacitor C2 on the input power supply side (See FIG. 1), the low potential line LL1, the switch Q4, the node X3 (Y3), and the resonance inductor LR.

The energy that has accumulated in the resonance inductor LR decreases as the current flows through the capacitor C2 on the input power supply side and, accordingly, the absolute value of the current flowing through the inductor LR and the absolute value of the current flowing through the primary coil 1 (2) of the transformer also come to be reduced. Hence, the ampere turns of the transformer are equal and the secondary current is divided into a loop current flowing through the diode D1 (D11) and a loop current flowing through the diode D2 (D12) so that the sum of the currents flowing through each of the secondary coils of the transformer is equal to the current flowing through the choke coils.

In addition, although two current loops which pass through the resonance inductor LR are formed as mentioned earlier in this period, because the current flowing through the diode DA gradually decreases, the absolute value of the current flowing through the resonance inductor LR and the absolute value of the current through the primary coil 1 (2) of the transformer become equal.

Thereafter, when the energy that has accumulated in the resonance inductor LR is all discharged, the current flowing through the resonance inductor LR=the current flowing through the primary coil 1 (2) of the transformer=0 A and the current flowing through the rectifier diode D1 (D11)=the current flowing through the rectifier diode D2 (12). Further, after this timing, the resonance inductor LR starts the accumulation of energy in an opposite direction to the previous direction.

That is, a new current loop of the current flowing in the direction opposite to the previous direction is formed by the resonance inductor LR and the primary coil 1 (2) of the transformer. This current increases with a ratio that is obtained by dividing the input voltage (=V) by the inductance of the resonance inductor LR. The current loop runs from the node X3 (Y3) at one end of the resonance inductor LR and returns to the node X3 (Y3) via the switch Q4, the low potential line LL1, the capacitor C2 on the input power supply side, the high potential line HL1, the switch Q1, the terminal X1 (Y1), the primary coil 1 (2), the terminal X2, and the resonance inductor LR.

As the current flowing through the primary coil 1 (2) in the reverse direction increases, the current S1 (S11) flowing through one rectifier diode D1 (D11) connected to the secondary coil decreases and the current S2 (S12) flowing through the other rectifier diode D2 (D12) gradually increases. Furthermore, when the current S1 (S11) is 0 A and the current S2 (S12) flowing through the secondary coils 10B and 20B of the transformer are equal to the total current flowing through the choke coils A and C, because the ampere turns of the transformer do not increase above this level, an increase in the current flowing through the primary coil 1 (2) is prevented but the capacitors CA and CB of the surge voltage suppression circuit comprising the diodes DA and DB and the inductor LR co-operate with one another, thereby constituting an LC series resonance circuit, and a resonance operation is started.

As a result of this resonance operation, two current loops which pass through the capacitors CA and CB are formed. The first current loop runs from the node X3 (Y3) and returns to the node X3 (Y3) via the switch Q4, the low potential line LL1, the capacitor C2 on the input power supply side, the high potential line HL1, the capacitor CA, and the resonance inductor LR. The other current loop runs from the node X3 (Y3) and returns to the node X3 (Y3) via the switch Q4, the low potential line LL1, the capacitor CB, and the resonance inductor LR.

Accordingly, because the capacitor CA is charged while the capacitor CB is discharged, the potential of the terminal X2 (Y2) slowly drops in accordance as the resonance operation progresses. Accordingly, the absolute value of the voltage across the two ends of the primary coil 1 (2) of the transformer increases and a voltage is also generated in the secondary coil. In addition, although the resonance operation by the capacitors CA and CB and the resonance inductor LR is to be continued, the potential of the terminal X2 (Y2) becomes 0V. Therefore, the voltage across the two ends of the capacitor CB and the diode DB becomes 0V, the current flowing through the capacitor CB also reaches 0 A, and the diode DB easily conducts.

Thus, because the diode DB conducts and the switch Q1 is in an ON state, the voltage across the two ends of the primary coil 1 (2) of the transformer is clamped at the input voltage (=V). Thus, the voltage across the two ends of the secondary coils 10B and 20B of the transformer is clamped at V/n (n is the winding number ratio between the primary and secondary coils of the transformer). Hence, the reverse voltage applied to the rectifier diode D1 (D11) is not greater than 2×V/n because each rectifier circuit RC has a center tap constitution. In other words, the reverse voltage applied to the rectifier diode D1 (D11) has a maximum value of 2×V/n or less and an increase in the surge voltage is suppressed.

In addition, in is period, because the diode DB conducts as detailed above, the current flowing through the resonance inductor LR=the current flowing through the primary coil 1 (2) of the transformer+the current flowing through the diode DB and the resonance current of the resonance operation is a loop current that flows from the node X3 (Y3) and returns to the node X3 (Y3) via the switch Q4, the low potential line LL1, the diode DB, and the resonance inductor LR.

Furthermore, here, as the choke coils D, A, B, and C are excited by the voltage across the two ends of the secondary coils 10B and 20B of the transformer, the current flowing through the choke coils D, A, B, and C increases and the current flowing through the primary coil=the current S1 (S11)+the current S2 (S12)=the current S2 (S12)=the current flowing through each of the choke coils A and C. Hence, the current in the primary coil also increases.

In addition, the current flowing through the resonance coil LR=the current flowing through the primary coil+the current flowing through the diode DB and, because the current flowing through the resonance coil LR is fixed, the current flowing through the diode DB decreases as a result of the increases in the current flowing through the primary coil and becomes 0 A at the end of period T5. The operation of the initial half cycle ends.

The operation of the remaining half cycle (periods T6 to T10) will be described next. The operation of the half cycle is also basically the same as the operation of the half cycle described in periods T1 to T5.

(Period T6: Switches Q4 and Q1 are ON)

In period T6, the switches Q4 and Q1 are in an ON state and the switches Q3 and Q2 are in an OFF state. Furthermore, the potential of the node X3 (Y3)=0V and the potential of the terminal X1 (Y1)=the input voltage (=V). In addition, the inductance of the resonance inductor LR is very small in comparison with the inductance of the primary coil 1 (2) of the transformer. Hence, the potential of the terminal X2 (Y2) ≈0V and the potential difference between the node X3 (Y3) and the terminal X2 (Y2) is also substantially equal to 0V.

Therefore, when the current flows into the inverter circuits INV1 and INV2, the resonance inductor LR is excited and power is transmitted from the primary side to the secondary side of the transformer. Accordingly, the loop current S2 (S12) flows to the secondary side of the transformer via the choke coil D (B), the rectifier diode D2 (D12), and the choke coil A (C), ad the load Z is driven. In this period, a forward voltage is applied to the rectifier diode D2 (D12) and the reverse voltage is applied to the rectifier diode D1 (D11).

(Period T7: Only the Switch Q4 is ON)

Thereafter, when period T7 starts, the switch Q1 is initially in an OFF state. Thereupon, the parasitic capacitor of the switches Q1 and Q2 (See FIG. 3C) and the resonance inductor LR co-operate with one another, thereby constituting an LC series resonance circuit and the resonance operation is made. As a result of this resonance operation, the parasitic capacitor of the switch Q2 is discharged while the parasitic capacitor of the switch Q1 is charged. Hence, the potential of the terminal X1 (Y1) gradually drops and becomes 0V. Furthermore, the reverse voltage of the rectifier diode D1 (D11) then gradually drops and finally reaches 0V.

(Period T8: the Switches Q4 and Q2 are ON)

When the potential of the terminal X1 (Y1) is 0V, the parasitic diode of the switch Q2 easily conducts. After the parasitic diode of the switch Q2 has conducted, at the start of the period T8, with the switch Q2 in an ON state, a ZVS operation is performed and, as a result, the short-circuit loss of the switch Q2 is suppressed.

Furthermore, the energy that has accumulated in the resonance inductor LR within the period T6 as mentioned earlier from the point where the potential of the terminal X1 (Y1) is 0V until the point where the switch Q4 is in an OFF state is circulated as current in the circuit connected to the two ends of the resonance inductor LR and the current that does not pass through the primary coil 1 (2) of the transformer also flows in the inverter circuit. Hence, the absolute value of the current flowing through the primary coil 1 (2) of the transformer decreases. Furthermore, the ampere turns in this transformer are equal and the current is divided into a loop current flowing through the rectifier diode D1 (D11) and a loop current flowing through the rectifier diode D2 (D12), which flow to the choke coils A (C).

(Period T9: Only Switch Q2 is ON)

Thereafter, when period T9 starts, the switch Q4 is in an OFF state. Thereupon, the parasitic capacitor of the switches Q3 and Q4 (See FIG. 3C) and the resonance inductor LR co-operate with one another, thereby constituting an LC series resonance circuit, and a resonance operation is performed. In this case, the parasitic capacitor of the switch Q3 is discharged while the parasitic capacitor of the switch Q4 is charged and, therefore, the potential of the node X3 (Y3) gradually rises and the potential of the node X3 (Y3) is the input voltage (=V).

Supposing that the potential of the node X3 (Y3) is the input voltage (=V), the potential of the terminal X2 (Y2) is then 0V and the potential difference between the terminal X2 and the node X3 is the input voltage (=V). Hence, the voltage across the two ends of the parasitic diode of the switch Q3 is 0V and conduction is easy.

(Period T10: Switches Q3 and Q2 are ON)

After the parasitic diode of the switch Q3 has conducted, at the start of the period T10, with the switch Q3 in an ON state, a ZVS operation is performed and, as a result, the short-circuit loss of the switch Q3 is suppressed.

Thereafter, in the initial period of the period T10, the energy that has accumulated in the resonance inductor LR flows to the capacitor C2 on the input power supply side (See FIG. 1) also following the completion of the charging and discharging of the parasitic capacitor of the switches Q3 and Q4. Further, as capacitor C2 is regenerated, the energy that has accumulated in the resonance inductor LR decreases and the absolute value of the current flowing through the resonance inductor LR and the absolute value of the current flowing through the primary coil 1 (2) of the transformer are accordingly also reduced. Hence, the ampere turns of the transformer are equal and, on the secondary side, current flows by being divided into a loop current that flows through the rectifier diode D1 (D11) and a loop current that flows through the rectifier diode D2 (D12), and the sum of the currents flowing through the secondary coils 10A and 10B (20A and 20B) of the transformer flows to the respective choke coils A (C).

Furthermore, with the diode DB non-conductive in this period, the absolute value of the current flowing through the resonance inductor LR and the absolute value of the current flowing through the primary coil 1 (2) of the transformer become equal.

Thereafter, when the energy that has accumulated in the resonance inductor LR is completely regenerated, the current flowing through the resonance inductor LR=the current flowing through the primary coil 1(2) of the transformer=0 A and the current flowing through the rectifier diode D1 (D11)=the current flowing through the rectifier diode D2 (D12).

Furthermore, after this timing, the resonance inductor LR accumulates energy in a direction opposite to the previous direction and a loop current in a direction opposite to the previous direction flows to the resonance inductor LR and the primary coil 1(2) of the transformer. The current flowing through the resonance inductor LR increases with the ratio V/L (L; the inductance of the inductor LR).

Hence, the ampere turns in the transformer are equal and the sum of the currents flowing through each of the secondary coils D1 (D11) and D2 (D12) of the transformer flows into the choke coils A and C. The loop current flowing trough the rectifier diode D1 (D11) and the loop current flowing through the rectifier diode D2 (D12) flow into the choke coils A and C. However, the current flowing through the rectifier diode D1 (D11) gradually increases while the current flowing through the rectifier diode D2 (D12) gradually decreases.

Furthermore, when the current flowing through the diode D2 (D12) is 0 A and the current flowing through the secondary coil 10A (20A) of the transformer are equal to the currents flowing through the choke coils A and C, because the ampere turns in the transformer do not increase above this level, an increase in the current flowing through the primary coil is prevented. However, the capacitors CA and CB of the surge voltage suppression circuit comprising the diodes DA and DB and the resonance inductor LR co-operate with one another, thereby constituting an LC series resonance circuit, and a resonance operation is started.

Thereafter, as a result of this resonance operation, because the capacitor CA is discharged while the capacitor CB is charged, the potential of the terminal X2 (Y2) gradually rises as this resonance operation progresses and becomes the input voltage (=V). Accordingly, the voltage across the two ends of the primary coil 1 (2) of the transformer increases and a voltage is also generated in each of the secondary coils 10A and 10B (20A and 20B).

Although the resonance operation by the capacitors CA and CB and the resonance inductor LR is to be continued, because the potential of the terminal X2 (Y2) is the input voltage (=V), the voltage across the two ends of the capacitor CA and the diode DA is 0V, the current flowing through the capacitor CA is 0 A, and the diode DA easily conducts.

Accordingly, because the diode DA conducts and the switch Q2 is in an ON state, the voltage across the two ends of the primary coil 1 (2) of the transformer is clamped at the input voltage (=V). As a result, the voltage across the two ends of the secondary coil 10A (20A) of the transformer is clamped at V/n. Hence, the reverse voltage applied to the rectifier diode D2 (D12) is not greater than 2×V/n because rectifier circuit RC has a center tap constitution. In other words, the reverse voltage applied to the rectifier diode D2 (D12) has a maximum value of 2×V/n or less and an increase in the surge voltage is suppressed.

In addition, when the diode DA conducts as above, the current flowing through the resonance coil LR is fixed. As the choke coils D, A, B, and C are excited by the voltage across the two ends of the secondary coils 10A and 20A of the transformer, the current flowing through these choke coils increases and the current flowing through the primary coil increases. In addition, the current flowing through the resonance coil LR=the current flowing through the primary coil+ the current flowing through the diode DA and, because the current flowing through the resonance coil LR is fixed, the current flowing through the diode DA decreases as a result of the increases in the current flowing through the primary coil. When the current flowing through the diode DA is 0 A, the operation of the latter half cycle ends and returns to the initial state of the period T1.

Figure 6:
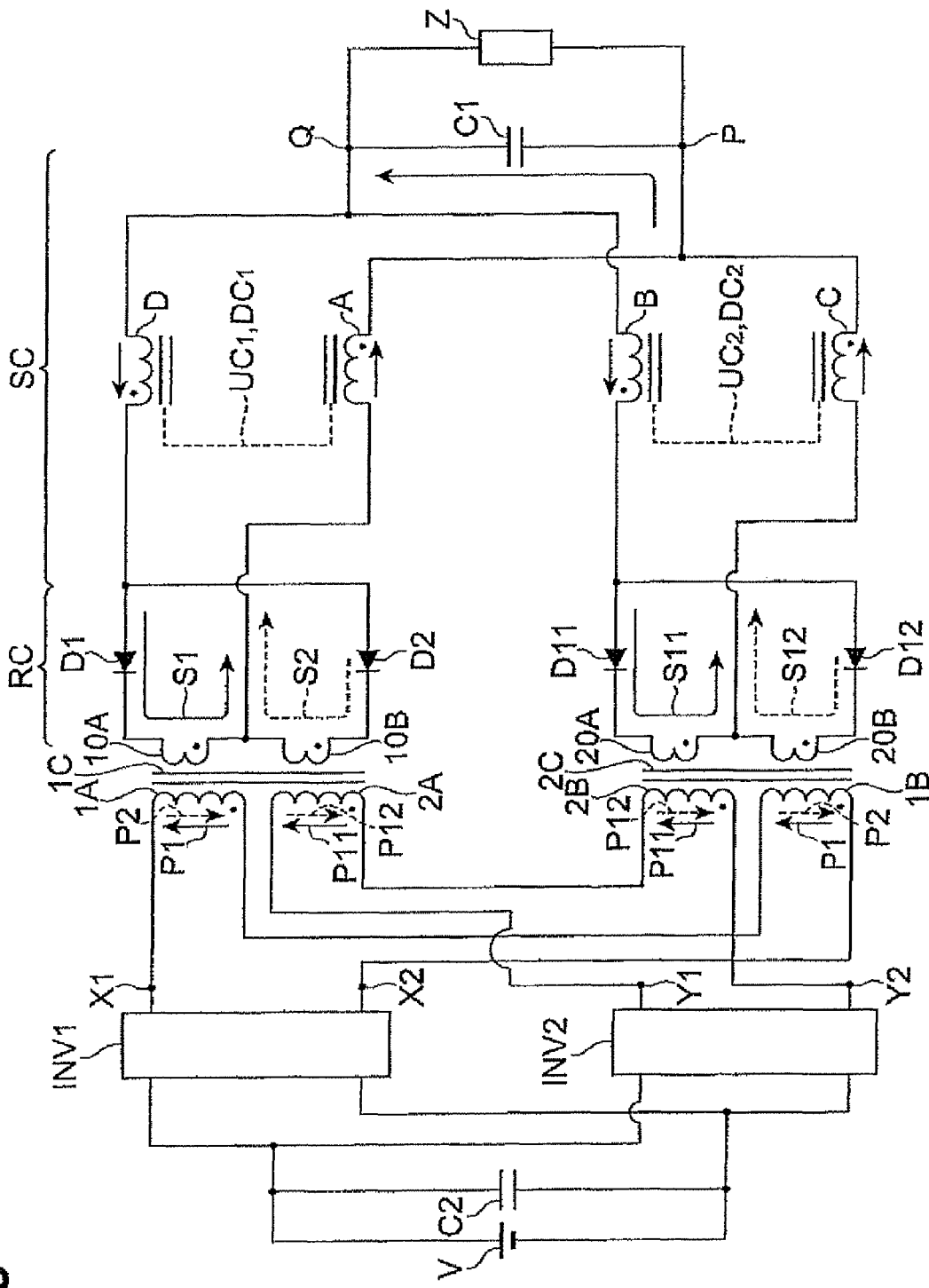
FIG. 6 is a circuit diagram of the switching power supply 100 in a case where the relationships of the primary coils 1A, 1B, 2A, and 2B with the secondary coils are switched.

FIG. 6 is a circuit diagram of the switching power supply 100 according to the second embodiment. In this embodiment, the relationships between the primary coils 1A, 1B, 2A, and 2B and the secondary coils are switched.

The primary coil 1A is magnetically coupled to the secondary coil 10A and has the same polarity. The primary coil 1B is magnetically coupled to the secondary coil 20B and has the same polarity. Because the primary coil 1A and primary coil 1B are connected in series, in cases where one AC resistance is relatively greater than the other, the ringing of the current flowing through the primary coils can be suppressed.

The primary coil 2A is magnetically coupled to the secondary coil 10B and has the same polarity. The primary coil 2B is magnetically coupled to the secondary coil 20A and has the same polarity. Because the primary coil 2A and primary coil 2B are connected in series, in cases where one AC resistance is relatively greater than the other, the ringing of the current flowing through the primary coils can be suppressed.

In cases where the currents P1 and P11 are flowing, the AC resistance of the primary coils 1A and 2B facing the secondary coils 10A and 20A through which the currents S1 and S11 flow is small and the AC resistance of the remaining primary coils 1B and 2A serially connected to the primary coils 1A and 2B becomes relatively high.

In cases where the currents P2 and P12 are flowing, the AC resistance of the primary coils 2A and 1B facing the secondary coils 10B and 20B through which the currents S2 and S12 flow is small and the AC resistance of the remaining primary coils 1A and 2B serially connected to the primary coils 2A and 1B becomes relatively high.

In addition, the operation on the secondary side of the transformer is the same as that above.

Figure 7:
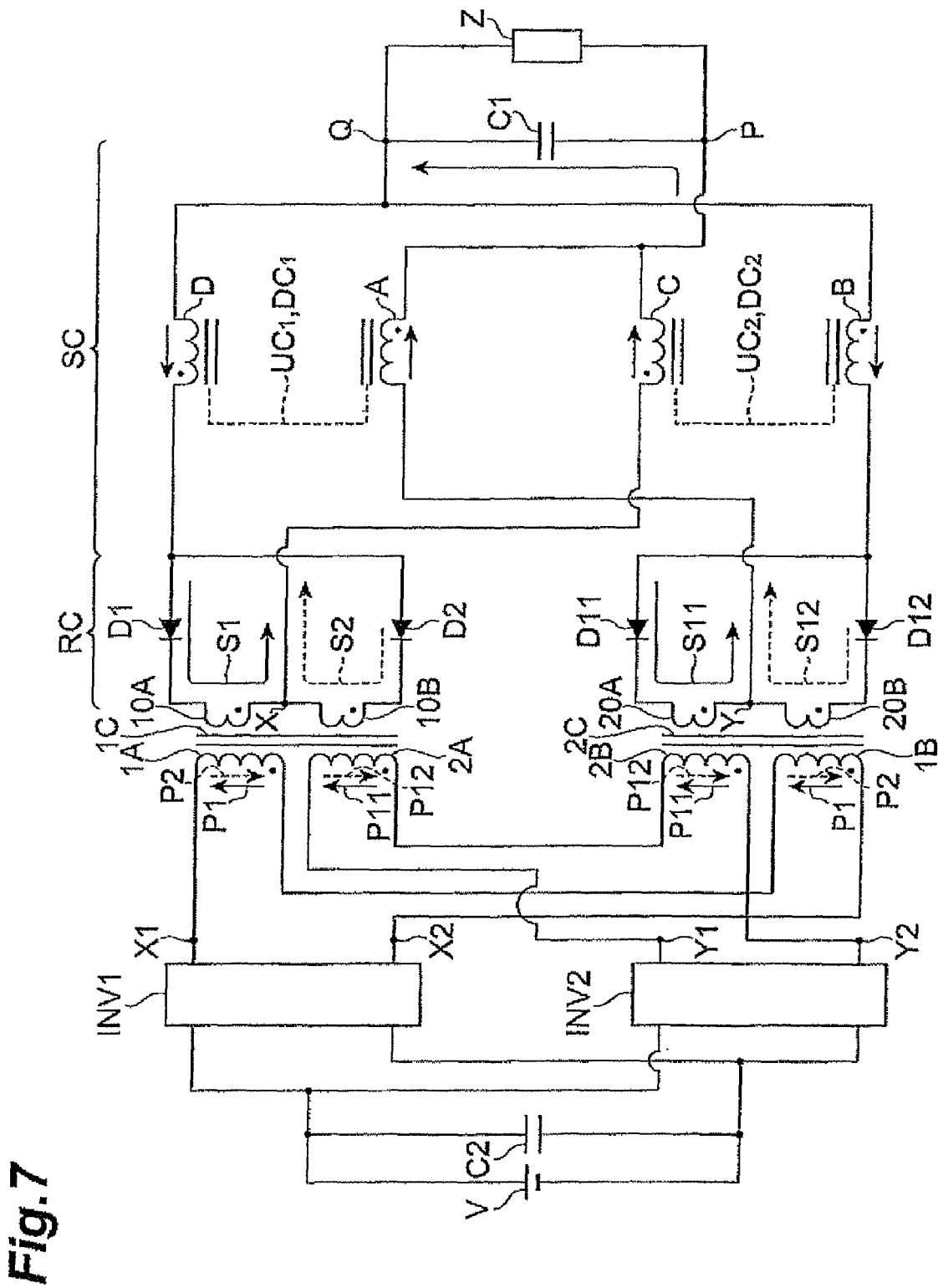
FIG. 7 is a circuit diagram of the switching power supply 100 in a cases where choke coils A and C connected to the connection points X and Y of secondary coils 10A, 10B, 20A, and 20B shown in FIG. 6 are switched.

FIG. 7 is a circuit diagram of the switching power supply 100 according to a third embodiment. In this embodiment the choke coils A and C connected to the connection points X and Y of the secondary coils 10A, 10B, 20A, and 20B shown in FIG. 6 are switched.

In this example, the choke coil C is connected to the connection point X and the choke coil A is connected to the connection point Y. The other terminals of the choke coils A and C are both connected to one terminal P of the capacitor C1. Also in the case of this example, the choke coils A and D are not magnetically coupled to the choke coils B and C.

The current flowing through the connection X flows to the terminal P via the choke coil C and the current flowing from the connection point Y likewise flows to the terminal P via the choke coil A.

In the case of this embodiment, the first rectifier circuit contained in a plurality of rectifier circuits RC is a center tap full-wave rectifier circuit that is connected to the secondary side coils 10A and 10B of the first transformer comprising the core 1C and the second rectifier circuit is a center tap full-wave rectifier circuit that is connected to the secondary coils 20A and 20B of the second transformer comprising the core 2C. Here, the first choke coil A is connected to the current output side of the second rectifier circuit, the third choke coil D is connected to the current input side of the first rectifier circuit, the second choke coil C is connected to the current output side of the first rectifier circuit, and the fourth choke coil B is connected to the current input side of the second rectifier circuit.

In this case, some of the relationships between the rectifier circuits and the cores of the choke coils are switched in comparison with those in FIG. 6. That is, there is the advantage that it is possible to make the characteristic difference between the rectifier circuits and the choke coils A to D more uniform.

The remaining operation is the same as that described earlier.

In cases where there is a potential difference between the choke coils B and A and the choke coils D and C, when a current flows to the choke coils in an ON-duty case, each choke coil is charged with the potential difference. In an OFF-duty case, the potential difference applied to the choke coils is the output voltage, and the serial connection between the choke coils B and A and the serial connection between the choke coils D and C carry the voltage equally. This is equivalent to inserting a voltage power supply of V1-V2 in series with the current loop of the choke coils C and D in cases where the sum V1 of the potential differences of the choke coil B and the choke coil A on the secondary coil side is greater than the sum V2 of the potential differences of the choke coils D and C on the secondary coil side, and the virtual voltage source is terminated in OFF duty mode. The difference in the voltages applied to the choke coils appears at the two ends of the choke coil with the smaller applied voltage.

The currents flowing through the choke coils A and D tend to equilibrate according to the number of windings and the currents flowing through one turn of the choke coils become equal. The currents flowing through the choke coils B and C also tend to equilibrate according to the number of windings and the currents flowing through one turn of the choke coils become equal.

The handling powers of the inverter circuits, transformers, and choke coils are in equilibrium in inverse proportion to the loss, and tend to equilibrate also with respect to temperature variations. In this example, because the output automatically reaches equilibrium and stabilizes, parts for achieving equilibrium are unnecessary. The costs can therefore be reduced. In addition, a conventional converter detects the input current and the output current of the first and second converters irrespective of the wiring resistance and the ON resistance of the semiconductor element and of the loss due to the drop in the forward voltage and controls the pulse width modulation so that the input and output currents are equal. Hence, the rise in temperature of the converter with a large loss due to inconsistencies between elements increases. Under the worst conditions of inconsistency, there has been the need to provide a margin for the permitted loss in order to establish the temperature. However, in the case of this example, because the output is structurally balanced and stabilizes, there is the advantage that there is no need to perform this control.

Figure 8:
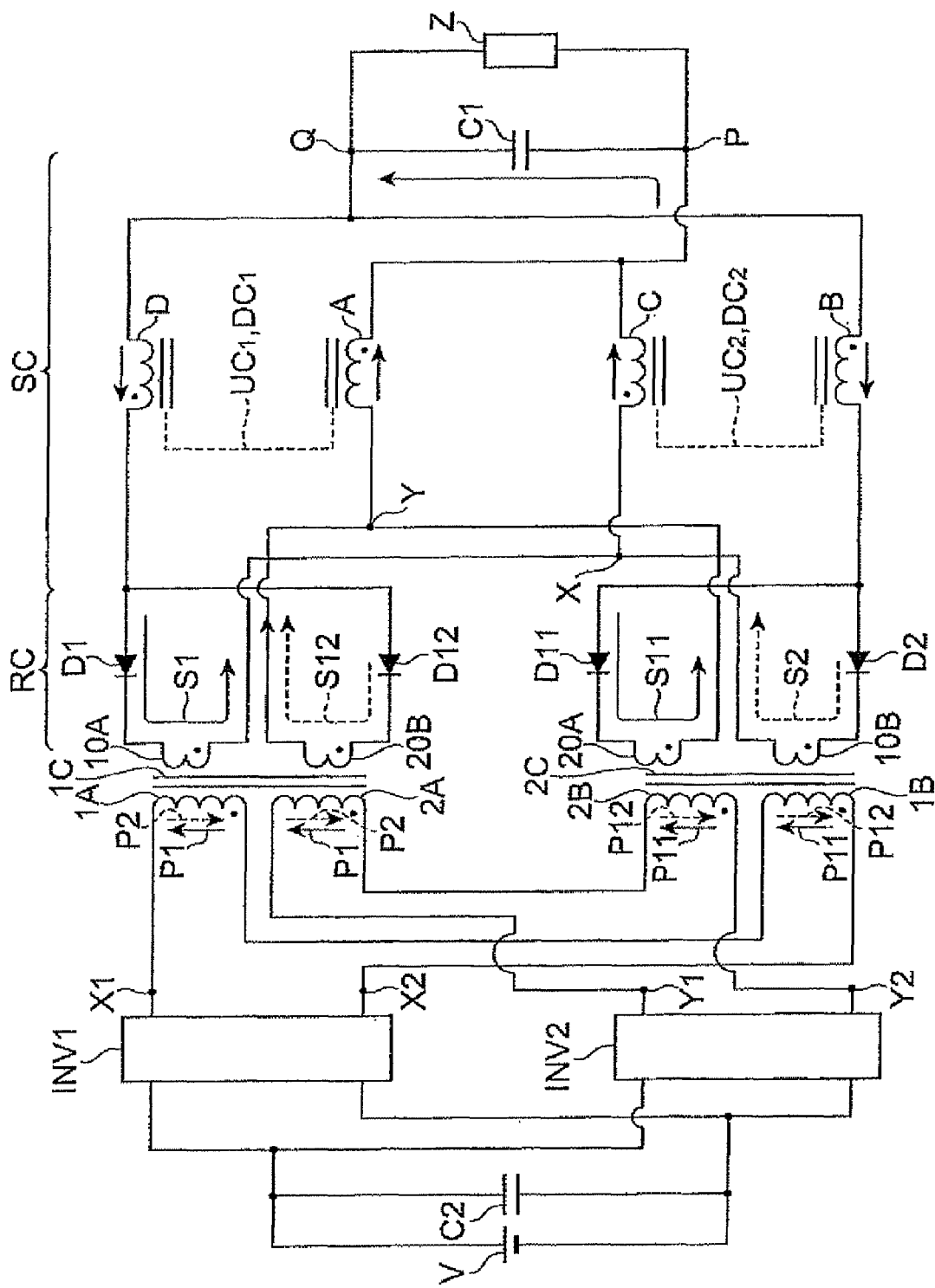
FIG. 8 is a circuit diagram of the switching power supply in a case where the arrangement of the secondary coils 10B and 20B is switched.

FIG. 8 is a circuit diagram of the switching power supply 100 according to the fourth embodiment. In this embodiment, the arrangement of the secondary coils 10B and 20B of the switching power supply shown in FIG. 7 is switched.

The secondary coils 10A and 10B are connected via the connection point X and the connection point X is connected to one end P of the capacitor C1 via the choke coil C.

The secondary coils 20A and 20B are connected via the connection point Y and the connection point Y is connected to one end P of the capacitor C1 via the choke coil A.

In this example, the secondary coils 10A and 10B are magnetically coupled to the primary coils 1A and 1B via the cores 1C and 2C of different transformers. Furthermore, the secondary coils 20A and 20B are magnetically coupled to the primary coils 2B and 2A via the cores 2C and 1C of different transformers.

In this embodiment the plurality of rectifier circuits RC comprise first and second rectifier circuits which are connected to the secondary coils of the first and second transformers. The first rectifier circuit is a center tap full-wave rectifier circuit that is connected to one secondary coil 10A of the first transformer comprising the core 1C and the other secondary coil 10B of the second transformer comprising the core 2C, and the second rectifier circuit is a center tap full-wave rectifier circuit that is connected to the other secondary coil 20B of the first transformer comprising the core 1C and one secondary coil 20A of the second transformer comprising the core 2C. The first choke coil A is connected to the connection point Y on the current output side of the second rectifier circuit, the third choke coil D is connected to the anode of the diode D1 on the current input side of the first rectifier circuit, the second choke coil C is connected to the connection point X of the current output side of the first rectifier circuit, and the fourth choke coil B is connected to the anode of the diode D11 on the current input side of the second rectifier circuit.

A switching power supply with the above structure also functions similarly to the switching power supply shown in FIG. 7. In addition, because the pairs of secondary coils with a center tap connection are connected to different transformers, the characteristic difference of the transformers can be compensated for and a stable output can be obtained.

Figure 9:
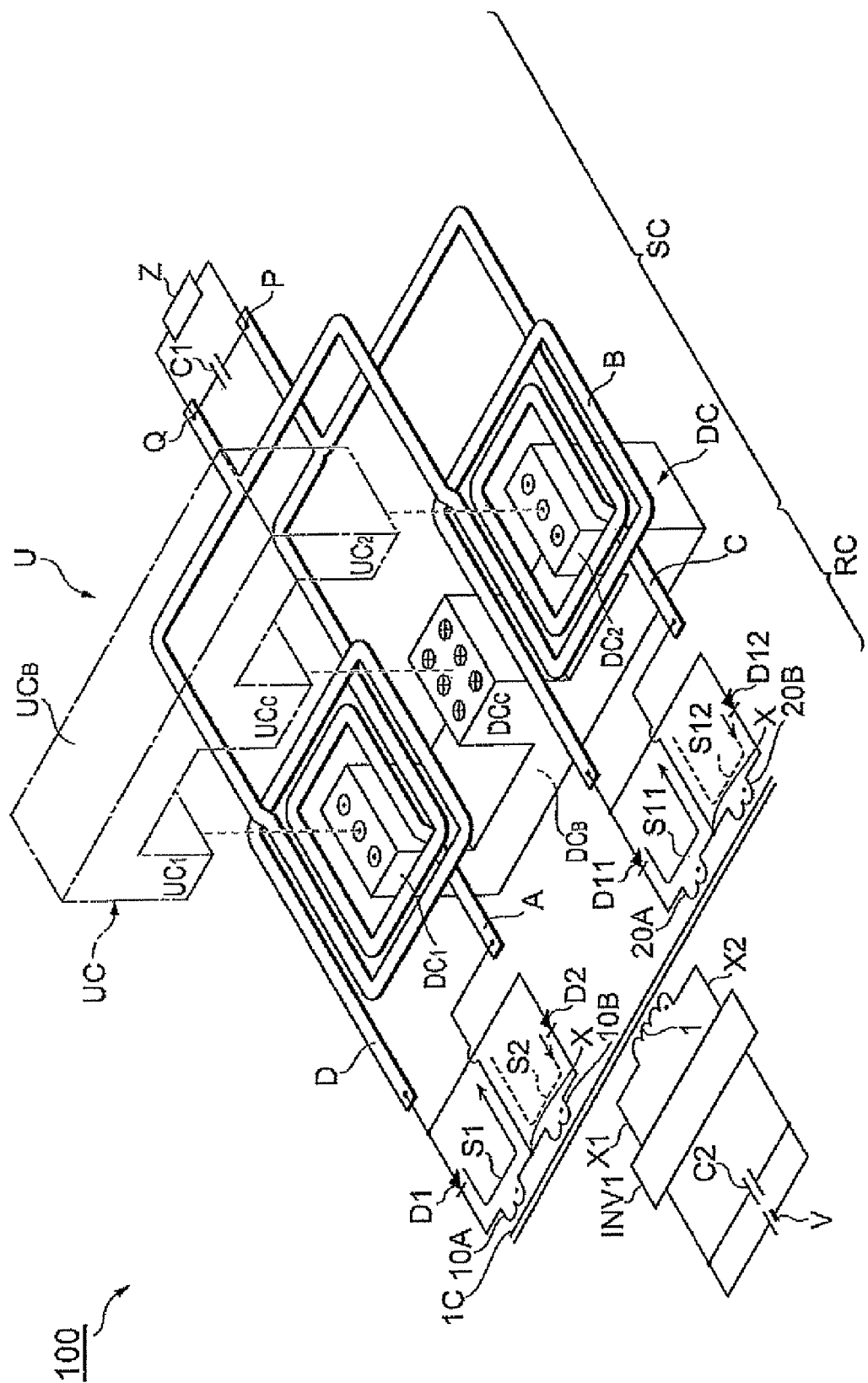
FIG. 9 is a perspective view of the switching power supply 100 according to a fifth embodiment.
Figure 10:
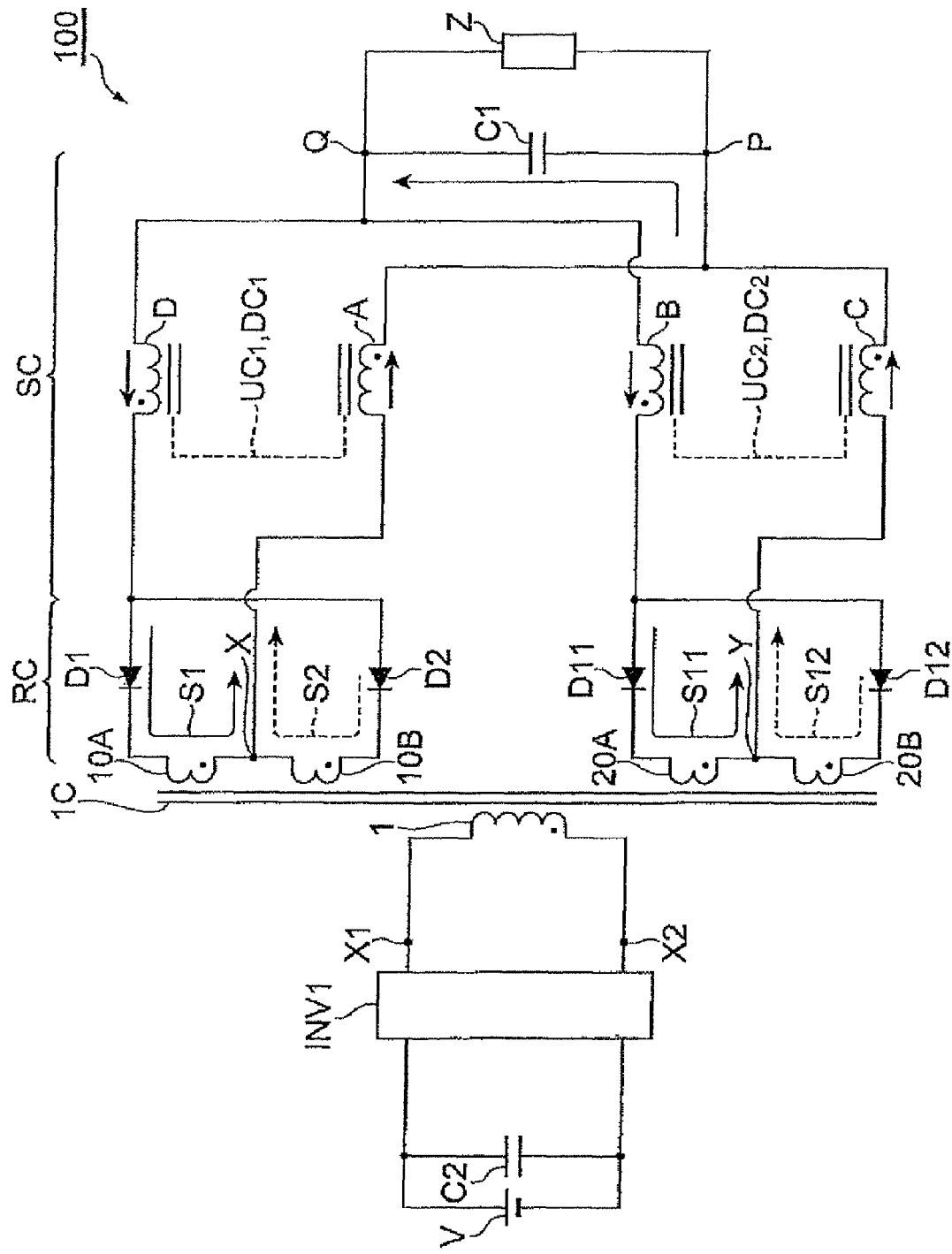
FIG. 10 is a circuit diagram of the switching power supply 100 shown in FIG. 9.

FIG. 9 is a perspective view of the switching power supply 100 according to the fifth embodiment. FIG. 10 is a circuit diagram of the switching power supply 100 shown in FIG. 9.

The switching power supply 100 of this embodiment is the switching power supply of the first embodiment wherein a single primary coil 1 driven by a single inverter circuit INV1 is magnetically coupled to the plurality of secondary coils 10A, 10B, 20A, and 20B via a single core 1C and the remaining constitution is the same as that of the first embodiment. The switching power supply comprises a single transformer, the primary coil of the transformer is driven by a single inverter circuit or a plurality of inverter circuits, and the secondary coil of the transformer is connected to a plurality of rectifier circuits.

Also in this case, similarly to the first embodiment, during smoothing, the current output by the secondary coil of the transformer flows simultaneously to the capacitor C1 by passing, at the same time, through a plurality of choke coils A to D corresponding with different cores, and a pair of the first and third choke coils A and D and a pair of the second and fourth choke coils C and B maintain a state of equilibrium so as to be inversely proportional to mutual loss without affecting one another. Hence, the output stabilizes and lower costs are possible. The remaining action is the same as that of the first embodiment and the connective relationship of the coils can be changed to conform to the constitution of the switching power supplies of the second to fourth embodiments.

The switching power supply above is a DC-DC converter but an input signal may also be input by performing full-wave rectification on a low frequency wave on the order of 50 Hz, for example, and an AC component can also be output by suitably adjusting the duty ratio of a switching pulse signal.

The number of capacitors C1 of the smoothing circuit is one in all in each embodiment, but capacitors may also be provided in a number corresponding with each of the choke coils.

In the above circuit, power is transmitted from a DC power supply V to the load Z via an inverter circuit but, conversely, the load Z can also be replaced with a second power supply and power can be transmitted from the second power supply Z to the DC power supply V. In other words, the switching power supply above is able to perform bidirectional power conversion. Such bidirectional power conversion technology is useful as elemental technology of a hybrid automobile or an electric automobile.

In particular, the switching power supply capable of performing bidirectional power conversion can be applied to power control or the like in which, in an electronic device comprising two series of secondary cells, in cases where there is a need to charge the secondary cell of one series, power is supplied from the secondary cell of the other series.

Figure 11:
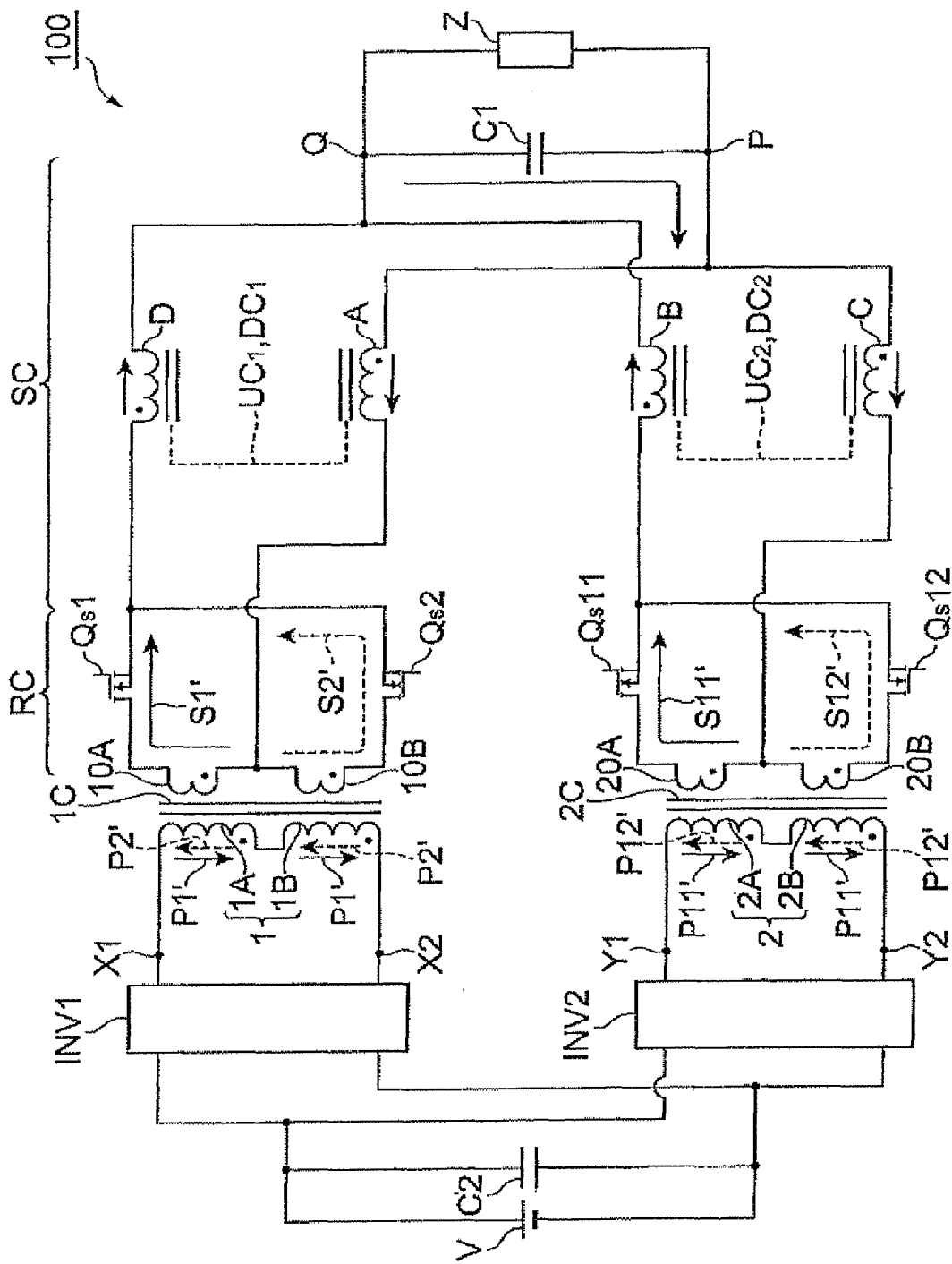
FIG. 11 is a circuit diagram of the switching power supply 100.

FIG. 11 is a circuit diagram of the switching power supply which serves to illustrate the transmission of power in the reverse direction in cases where Z is a second power supply.

In this switching power supply, the diodes D1, D2, D11, and D12 of the rectifier circuit RC shown in FIG. 5 have been replaced with the transistors Qs1, Qs2, Qs11, and Qs12 respectively. Here, power conversion from the DC power supply V to the load Z in a case where Z is the load is called 'forward power conversion' and power conversion from the second power supply Z to the DC power supply V in a case where the load Z is replaced with the second power supply is known as 'reverse power conversion'. In forward power conversion, power is transmitted from the capacitor C2 to the capacitor C1 and, in reverse power conversion, power is transmitted from the capacitor C1 to the capacitor C2.

The transistors Qs1, Qs2, Qs11, and Qs12 comprise a field effect transistor (FET) but can also be constituted by an insulated-gate bipolar transistor (IGBT).

In the case of forward power conversion, when the transistors Qs1, Qs2, Qs11, and Qs12 are constituted by a normal FET, the gate voltages of the respective transistors Qs1, Qs2, Qs11, and Qs12 may be increased to or above a threshold value only in the period in which the forward current flows to the diodes D1, D2, D11, and D12 shown in FIG. 5 so that the transistors Qs1, Qs2, Qs11, and Qs12 exhibit a function equivalent to that of a diode. Alternatively, in cases where the transistors Qs1, Qs2, Qs11, and Qs12 are constituted by a normal FET, a PN function comprising a source region and a semiconductor substrate of different conductivity types can also be utilized to exhibit a function equivalent to that of the diodes D1, D2, D11, and D12. In cases where the transistors Qs1, Qs2, Qs11, and Qs12 are constituted by an IGBT, diodes which are connected in parallel to the respective bipolar transistors so that the anode corresponds to the emitter of the respective bipolar transistors and the cathode corresponds to the collector of the respective bipolar transistors are utilized and the diodes connected in parallel to the transistors Qs1, Qs2, Qs11, and Qs12 respectively can be made to function as the diodes D1, D2, D11, and D12 shown in FIG. 5.

The remaining action of the forward power conversion is the same as that of the earlier embodiments.

However, in the case of reverse power conversion, the transistors Qs1, Qs2, Qs11, and Qs12 are made to function as switching elements. The functions of the primary coil and secondary coil are switched with respect to the power conversion and the functions of the rectifier circuits and the switching circuits are switched. In cases where the current flows from the terminal Q to the terminal P, the current flows into the coils 10A, 10B, 20A, and 20B once current has accumulated in the choke coils A and C. The currents output by the coils 10A, 10B, 20A, and 20B return to the terminal Q once current has accumulated in the choke coils D and C.

In cases where a current S1' flows through the transistor Qs1 and the coil 10A, a current P1' flows to the coils 1A and 1B, which are magnetically coupled to the transistor Qs1 and the coil 10A, and, subsequently, in cases where a current S2' flows through the transistor Qs2 and the coil 10B, a current P2' flows to the coils 1A and 1B, which are magnetically coupled to the transistor Qs2 and the coil 10B. The directions of the currents P1' and P2' are opposite directions.

Likewise, in cases where the current S11' flows through the transistor Qs11 and the coil 20A, the current P11' flows to the coils 2A and 2B, which are magnetically coupled to the transistor Qs11 and the coil 20A, and, subsequently, in cases where a current S12' flows through the transistor Qs12 and the coil 20B, a current P12' flows to the coils 2A and 2B, which are magnetically coupled to the transistor Qs12 and the coil 20B. The directions of the currents P11' and P12' are opposite directions.

The currents S1' and S11' are in-phase and in sync and the currents S2' and S12' are also in-phase and in sync. Where reverse power conversion is concerned, the switches Q1, Q2, Q3, and Q4 shown in FIGS. 3A and 3B are made to function as rectifier diodes. In other words, the switches Q1, Q2, Q3, and Q4 comprise a normal EFT or IGBT and a diode which is connected in parallel to the normal EFT or IGBT and are made to function as diodes.

In a case where the currents S1' and S11' flow in the coils 10A and 20A on the right-hand side of FIG. 11 and where the currents P1' and P11' flow in the coils 1 and 2 on the left-hand side of FIG. 11, the potential of the terminal X2 (Y2) in FIGS. 3A and 3B is higher than the potential of the terminal X1 (Y1). Hence, the current flows from the terminal X2 (Y2) to the capacitor C2 or DC power supply V via the diode DA and flows to the terminal X1 (Y1) via the switch Q2.

Meanwhile, in a case where the currents S2' and S12' flow in the coils 10B and 20B on the right-hand side of FIG. 11 and where the currents P2' and P12' flow in the coils 1 and 2 on the left-hand side of FIG. 11, the potential of the terminal X1

(Y1) in FIGS. 3A and 3B is higher than the potential of the terminal X2 (Y2). Hence, the current flows from the terminal X1 (Y1) to the capacitor C2 or DC power supply V via the switch Q1 and flows to the terminal X1 (Y1) via the diode DB.

So too in the case of reverse power conversion, in an inverter circuit comprising the transistors Qs1, Qs2, Qs11, and Qs12, in principle, in the period T1, the transistors Qs1 and Qs11 are in-phase and ON and the transistors Qs2 and Qs12 are in-phase and OFF and, in the period T2 following the period T1, the transistors Qs1 and Qs11 are in-phase and OFF and the transistors Qs2 and Q12 are in-phase and ON. However, these ON/OFF periods T1 and T2 partially overlap one another and modification to complete separate the two periods is also possible.

In addition, in cases where the switches Q1 to Q4 constituting the inverter circuit are made to function as a rectifier circuit, parasitic diodes (body diodes) of transistors constituting the respective switches Q1 to Q4 can also be used as rectifier elements. That is, in the case of reverse power conversion, when the switches Q1 to Q4 are constituted by normal FET, the switches Q1 to Q4 are switched to exhibit a function equivalent to that of a rectifier diode or a parasitic diode (body diode) that is attached to the FET of the switches Q1 to Q4 is made to function as a rectifier diode.

In cases where diodes DA and DB do not exist, naturally such diodes may exist but, in this case, when the switches Q2 and Q3 are made to exhibit a rectifying action in the case of reverse power conversion, the current flowing from the terminal X2 to the resonance inductor LR reaches the capacitor C2 or the DC power supply V via the switch Q3 and then returns to the terminal X1 via the switch Q2. Only in the period in which current flows from the terminal X2, the switches Q3 and Q2 are turned ON or current is made to flow in a forward direction within the parasitic diodes thereof when the gate voltage of the switches Q3 and Q2 is equal to or more than a threshold value. In this period, the switches Q1 and Q4 are OFF. In cases where the diode DA exists, because a forward current flows from the terminal X2 to the diode DA, the switch Q3 may be in an OFF state.

Furthermore, conversely, when the switches Q1 and Q4 are made to exhibit rectifying action in the case of reverse power conversion, the current that flows from the terminal X1 to the switch Q1 reaches the capacitor C2 or the DC power supply V and then returns to the terminal X2 via the switch Q4. Only in the period in which current flows from the terminal X1, the switches Q1 and Q4 are turned ON or current is made to flow in a forward direction within the parasitic diodes thereof when the gate voltage of the switches Q1 and Q4 is equal to or more than a threshold value. In this period, the switches Q2 and Q3 are OFF. In cases where the diode DB exists, a forward current flows through the diode DB to reach the terminal X2, the switch Q4 may therefore be in an OFF state.

In addition, at the time of rectifying action in the case of reverse power conversion, in cases where the switches Q1 to Q4 are constituted by an IGBT, diodes which are connected in parallel to the respective bipolar transistors so that the anode corresponds to the emitter of the respective bipolar transistors and the cathode corresponds to the collector of the respective bipolar transistors are utilized and the diodes connected in parallel to the transistors Q1 to Q4 respectively can be made to function so that the current is rectified as mentioned earlier.

As mentioned earlier, in the reverse power conversion, the inverter circuits INV1 and INV2 can be made to function as rectifier circuits and the output current can be transmitted to the capacitor C2 to charge the DC power supply V.

As mentioned earlier, in the example shown in FIG. 1, the rectifier elements (diodes) constituting the rectifier circuit RC comprise transistors Qs1, Qs2, Qs11, and Qs12 and the rectifier circuit RC can be made to function as an inverter circuit that performs a synchronized rectifying operation by switch-driving the transistors and it is also possible to transmit power in the reverse direction via the rectifier circuit RC from the load Z provided downstream of the rectifier circuit RC. Bidirectional power conversion is accordingly possible. In the case of reverse power conversion, the DC power supply V can also be replaced with a load. Moreover, the bidirectional power conversion constitution can also be applied to the switching power supply of another embodiment.

What is claimed is:

1. A switching power supply comprising a smoothing circuit that is connected downstream of a plurality of rectifier circuits,
   wherein the smoothing circuit comprises:
   first and second choke coils one end of each of which is connected to one end of a capacitor;
   third and fourth choke coils one end of each of which is connected to the other end of the capacitor;
   a first core, around which the first and third choke coils are disposed;
   a second core, around which the second and fourth choke coils are disposed; and
   a common core, and
   wherein one annular magnetic path that passes within the first core and the common core is formed by currents that flow simultaneously trough the first and third choke coils and another magnetic path that passes within the second core and the common core is formed by currents that flow simultaneously through the second and fourth choke coils in synchronization with currents that flow simultaneously through the first and third choke coils.

2. The switching power supply according to claim 1, comprising:
   a plurality of transformers having first and second transformers,
   wherein a primary coil of the plurality of transformers is driven by a single inverter circuit or a plurality of inverter circuits, and
   a secondary coil of the plurality of transformers is connected to the plurality of rectifier circuits.

3. The switching power supply according to claim 1, comprising:
   a single transformer,
   wherein a primary coil of the transformer is driven by a single inverter circuit or a plurality of inverter circuits, and
   a secondary coil of the transformer is connected to the plurality of the rectifier circuits.

4. The switching power supply according to claim 2, wherein the plurality of rectifier circuits comprise first and second rectifier circuits connected to the secondary coils of the first and second transformers, and
   wherein the first rectifier circuit is a first center tap full-wave rectifier circuit that is connected to the secondary coil of the first transformer,
   the second rectifier circuit is a second center tap full-wave rectifier circuit that is connected to the secondary coil of the second transformer,
   the first choke coil is connected to the current output side of the first rectifier circuit,
   the third choke coil is connected to the current input side of the first rectifier circuit,
   the second choke coil is connected to the current output side of the second rectifier circuit, and the fourth choke coil is connected to the current input side of the second rectifier circuit.

5. The switching power supply according to claim 2, wherein the plurality of rectifier circuits comprise first and second rectifier circuits connected to the secondary coils of the first and second transformers, and wherein the first rectifier circuit is a first center tap full-wave rectifier circuit that is connected to the secondary coil of the first transformer, the second rectifier circuit is a second center tap full-wave rectifier circuit that is connected to the secondary coil of the second transformer, the first choke coil is connected to the current output side of the second rectifier circuit, the third choke coil is connected to the current input side of the first rectifier circuit, the second choke coil is connected to the current output side of the first rectifier circuit, and the fourth choke coil is connected to the current input side of the second rectifier circuit.

6. The switching power supply according to claim 2, wherein the plurality of rectifier circuits comprise first and second rectifier circuits connected to the secondary coils of the first and second transformers, and wherein the first rectifier circuit is a first center tap full-wave rectifier circuit that is connected to one secondary coil of the first transformer and the other secondary coil of the second transformer, the second rectifier circuit is a second center tap full-wave rectifier circuit that is connected to the other secondary coil of the first transformer and one secondary coil of the second transformer, the first choke coil is connected to the current output side of the second rectifier circuit, the third choke coil is connected to the current input side of the first rectifier circuit, the second choke coil is connected to the current output side of the first rectifier circuit, and the fourth choke coil is connected to the current input side of the second rectifier circuit.

7. The switching power supply according to claim 2, wherein primary coils of the respective first and second transformers, whose AC resistances during driving by the inverter circuits become high alternately, are connected in series.

8. The switching power supply according to claim 1, wherein rectifier elements constituting the rectifier circuits comprise transistors, the rectifier circuits are made to function as inverter circuits by switch-driving the transistors, and power is transmitted in the reverse direction via the rectifier circuits from the power supply provided downstream of the rectifier circuits.

* * * * *